US011321164B2

(12) United States Patent
Moss et al.

(10) Patent No.: US 11,321,164 B2
(45) Date of Patent: May 3, 2022

(54) ANOMALY RECOGNITION IN INFORMATION TECHNOLOGY ENVIRONMENTS

(71) Applicant: International Business Machines Corporation, Armonk, NY (US)

(72) Inventors: Chris Moss, Brisbane (AU); Simon J. Kofkin-Hansen, San Francisco, CA (US); Jordan Shamir, Austin, TX (US); Devin Conley, Austin, TX (US); James Patrick Hoff, Chapel Hill, NC (US); Iain Mccown, Austin, TX (US); Scott Moonen, Fuquay Varina, NC (US); Bryan M. Buckland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/915,525

(22) Filed: Jun. 29, 2020

(65) Prior Publication Data

US 2021/0406106 A1 Dec. 30, 2021

(51) Int. Cl.
*G06F 11/07* (2006.01)
*G06F 16/23* (2019.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 16/2379* (2019.01)

(58) Field of Classification Search
CPC ............... G06F 11/079; G06F 11/0706; G06F 11/0751; G06F 11/0778
See application file for complete search history.

(56) References Cited

U.S. PATENT DOCUMENTS 7,738,373 B2 6/2010 Lerner
8,805,763 B2 8/2014 Retter
(Continued)

FOREIGN PATENT DOCUMENTS

CN 107154950 A 9/2017
CN 107707541 A 2/2018
(Continued)

OTHER PUBLICATIONS

Siyang Lu, "Detecting Anomalies from Big Data System Logs," Dissertation, University of Central Florida, 2019, 119 pages.
(Continued)

*Primary Examiner* — Nadeem Iqbal
(74) *Attorney, Agent, or Firm* — Peter J. Edwards

(57) ABSTRACT

A method comprises obtaining a set of log files for a software system. The set of log files applies to an extended window. A periodic pattern in a first set of error-event surges in the set of log files is identified. The error-event surges in the first set is identified as event noise. A second set of log files for the software system is obtained. The second set of log files applies to a shortened window. Timeseries analysis on the second set of log files is performed. A particular error-event surge in a detection period in the second set of log files that is abnormal as compared to the shortened window is detected based on the timeseries analysis. That the particular error-event surge does not fit into the periodic pattern is determined, the particular error-event surge is characterized as an anomaly, based on the determining.

20 Claims, 11 Drawing Sheets

(56) References Cited

U.S. PATENT DOCUMENTS

| | | | |
|---|---|---|---|
| 8,965,822 | B2 | 2/2015 | Frank et al. |
| 9,639,662 | B2 | 5/2017 | Sethumadhavan et al. |
| 9,928,155 | B2 | 3/2018 | Xu et al. |
| 10,127,125 | B2 * | 11/2018 | Krishnan ............ G06F 11/0751 |
| 10,614,913 | B2 | 4/2020 | Sethumadhavan et al. |
| 10,860,405 | B1 * | 12/2020 | Zonneveld .......... G06F 11/0709 |
| 2017/0031741 | A1 * | 2/2017 | Seigel ................... H04L 41/069 |
| 2018/0075192 | A1 | 3/2018 | Sethumadhavan et al. |
| 2018/0104502 | A1 | 4/2018 | Perschbacher et al. |
| 2020/0211325 | A1 * | 7/2020 | Kaizerman ........ G06Q 30/0185 |
| 2021/0142233 | A1 * | 5/2021 | Masood ................. G06N 3/088 |

FOREIGN PATENT DOCUMENTS

| | | |
|---|---|---|
| WO | 2015079264 A1 | 6/2015 |
| WO | 2019060327 A1 | 3/2019 |

OTHER PUBLICATIONS

Liu et al., "Machine Learning and Deep Learning Methods for Intrusion Detection Systems: A Survey," Applied Sciences, MDPI, Oct. 17, 2019, 28 pages.

Chalapathy et al., "Deep Learning for Anomaly Detection: A Survey," Jan. 24, 2019, 50 pages.

Gao et al., "RobustTAD: Robust Time Series Anomaly Detection via Decomposition and Convolutional Neural Networks," Alibaba DAMO Academy, 2020, 9 pages.

"Semi-Supervised Classification Using Object Metadata," IP.Com, An IP.com Prior Art Database Technical Disclosure, IP.com No. IPCOM000252345D, IP.com Electronic Publication Date: Jan. 5, 2018, 34 pages.

"Learning Better Font Slicing Strategies from Data," IP.Com, An IP.com Prior Art Database Technical Disclosure, IP.com No. IPCOM000251988D, IP.com Electronic Publication Date: Dec. 13, 2017, 33 pages.

"Automatic Categorization of IT Infrastructure Service Management Data Using Natural Language Processing and Machine Learning," IP.Com, An IP.com Prior Art Database Technical Disclosure, IP.com No. IPCOM000245200D IP.com Electronic Publication Date: Feb. 18, 2016, 7 pages.

Mell et al., "The NIST Definition of Cloud Computing," Recommendations of the National Institute of Standards and Technology, U.S. Department of Commerce, Special Publication 800-145, Sep. 2011, 7 pages.

"Machine Intelligence Technology," Numenta, Printed Jun. 17, 2020, 3 pages https://numenta.com/machine-intelligence-technology/.

Mannila et al., "Discovery of Frequent Episodes in Event Sequences," Kluwer Academic Publishers, Data Mining and Knowledge Discovery 1, 1997, pp. 259-289, https://www.win.tue.nl/~aerebre/ks/dmkd97episodes.pdf.

Li Wei et al., "Assumption-Free Anomaly Detection in Time Series," Printed Jun. 17, 2020, 4 pages http://alumni.cs.ucr.edu/~ratana/SSDBM05.pdf.

Fu et al., "Execution Anomaly Detection in Distributed Systems through Unstructured Log Analysis," Printed Jun. 17, 2020, 10 pages, https://www.microsoft.com/en-us/research/publication/execution-anomaly-detection-in-distributed-systems-through-unstructured-log-analysis/.

Lin et al., "Log Clustering based Problem Identification for Online Service Systems," 2016 IEEE/ACM 38th IEEE International Conference on Software Engineering Companion, DOI: http://dx.doi.org/10.1145/2889160.2889232, 2016, 10 pages, https://www.microsoft.com/en-us/research/wp-content/uploads/2016/07/ICSE-2016-2-Log-Clustering-based-Problem-Identification-for-Online-Service-Systems.pdf.

Meng et al., "Device-Agnostic Log Anomaly Classification with Partial Labels," IEEE, 2018, 6 pages https://aiops.org/wp-content/uploads/2018/06/Device_Agnostic_Log_Anomaly_Classification.pdf.

Weixi Li, "Automatic Log Analysis using Machine Learning," Awesome Automatic Log Analysis version 2.0, Nov. 2013, 50 pages, http://uu.diva-portal.org/smash/get/diva2:667650/FULLTEXT01.pdf.

Moss et al., "Anomaly Classification in Information Technology Environments," U.S. Appl. No. 16/915,567, filed Jun. 29, 2020.

List of IBM Patents or Patent Applications Treated as Related, Dated Jun. 29, 2020, 2 pages.

Ribeiro et al., "Why Should I Trust You?" Explaining the Predictions of Any Classifier, arXiv, 1602.04938, Aug. 9, 2016, 10 pages, https://arxiv.org/pdf/1602.04938.pdf.

"Automated insights for VMware & AWS," Runecast, Predictive analytics & security compliance, Printed Jun. 25, 2020, 14 pages, https://www.runecast.com.

"vRealize Log Insight," VMware, Log Management Tool and Analytics, vRealize Log Insight, VMware, Printed Jun. 25, 2020, 7 pages, https://www.vmware.com/products/vrealize-log-insight.html.

"vRealize Operations," VMware, What is vRealize Operations? IT Operations Management, VMware, Printed Jun. 25, 2020, 12 pages, https://www.runecast.com.

* cited by examiner

ANOMALY RECOGNITION IN INFORMATION TECHNOLOGY ENVIRONMENTS

BACKGROUND

The present disclosure relates to recognizing problems in information technology environments, and more specifically, to automatically detecting anomalies in converged software stacks.

Software systems sometimes create log files that list records of events that occur while the software system is operating. A log file, therefore, oftentimes takes the form of a chronological list of events performed by or detected by the software system. An event in a lot may take several forms, such as an error, an alert, and a status message.

Log files of a software system can be referenced when the software system is not functioning properly. Information technology professionals review log files to identify potential problems that may be causing symptoms with the software system.

SUMMARY

Some embodiments of the present disclosure can be illustrated as a method comprising obtaining a set of log files for a software system. The set of log files may apply to an extended window. The method may also comprise identifying a periodic pattern in a first set of error-event surges in the set of log files. The method may also comprise identifying the error-event surges in the first set as event noise. The method may further comprise obtaining a second set of log files for the software system. The second set of log files may apply to a shortened window. The method may also comprise performing times series analysis on the second set of log files. The method may also comprise detecting, based on the times series analysis, a particular error-event surge in a detection period in the second set of log files that is abnormal as compared to the shortened window. The method may also comprise determining that the particular error-event surge does not fit into the periodic pattern. Finally, the method may comprise characterizing, based on the determining, the particular error-event surge as an anomaly.

Some embodiments of the present disclosure can also be illustrated as a system or computer program product configured to perform the above-described method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
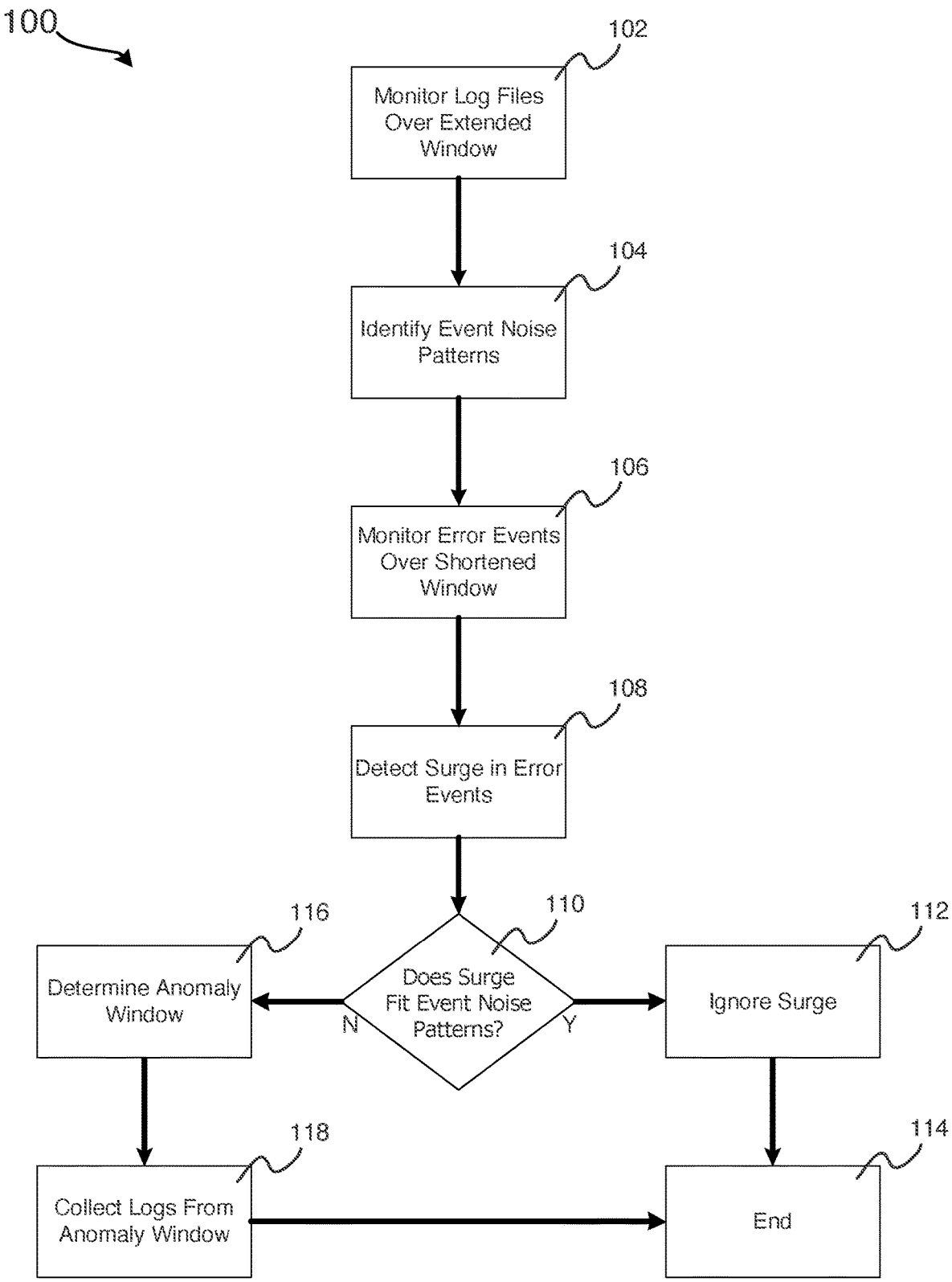
FIG. 1 depicts an example method of detecting potential anomalous time periods in a software system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to recognizing problems in information technology environments, and more specifically, to automatically detecting anomalies in converged software stacks. While the present disclosure is not necessarily limited to such applications, various aspects of the disclosure may be appreciated through a discussion of various examples using this context.

Software systems, such as software programs and collections of software programs, typically track events that occur during the operation of those systems in event logs (also referred to herein as "log files" or "logs"). These event logs are often stored in the form of log files, which are typically organized as a chronological list of recorded events (also referred to herein as "event entries"). These recorded events may take various forms, depending on the activity recorded by the event. For example, an event recording a process that did not succeed may be recorded as an "error" event, whereas a notification of a potentially problematic status may be recorded as an "alert" event. Neutral statuses may also be recorded as "status" events in log files. For example, log files may contain event entries that record the beginning of a process in the software system, as well as event entries that record the end of a process. Event logs for a software system may be useful for diagnosing problematic symptoms that occur during operation of a software system.

In typical software-system deployments, information-technology personnel (also referred to herein as "IT personnel") are responsible for maintaining the performance, stability, and other operational aspects of the software system. These IT personnel may also be referred to herein as "operators." These IT personnel often review log files when the software system they are maintaining is not operating as expected. For example, when a problem is reported to information-technology personnel (also referred to herein as "IT personnel"), the problem report may take the form of an information-technology (also referred to herein as "IT") ticket submitted by an end user with a set of log files attached. In some instances, a problem reported to an IT department is well defined and the logs are relevant and easy to read. However, in some instances multiple events from a single log, or events from multiple logs, must be analyzed before the cause of an issue is identified. Indeed, in some instances an IT professional is required to analyze a large number of event logs just to determine what the problem actually is before attempting to resolve it. Further, in some instances an IT ticket may not have logs attached, requiring an IT professional to obtain logs manually. Finally, in some instances an IT professional is required to resolve issues (or potential issues) that have not been specifically identified by an end user. In these instances, the IT professional may simply be aware that the software system may not be performing optimally, but the precise problem may be unclear. Resolving these nebulous issues may require review of a large number of log files to identify the area of the software system that may not be functioning optimally.

Historically, review of recorded events in log files has been performed manually by IT personnel. In software systems of relatively small size and complexity, manual review of log files is sometimes a feasible method of resolving potential issues with the software system. However, even some small software systems create events that are numerous enough or complex enough that manual review of log files can be a burden on resources. Even small, relatively simple software systems may be operated by companies without sophisticated IT departments. In these situations, manual review of log files may be infeasible. Further, as software systems increase in size, complexity, or both, the amount of events that are recorded in the software systems' log files can increase significantly. At some levels of size/complexity, logs become so numerous and complex that manual review can become infeasible, or even impossible, even for large, sophisticated IT departments.

For this reason, some solutions exist for automating some level of log review and problem identification. These solutions can be used to reduce the amount of time that IT professionals are required to spend reviewing and analyzing log events when maintaining software systems. For example, some log-analysis systems can be trained to identify particular combinations of particular log events, and associate those combinations with particular system problems. These system problems are typically identified ahead of time, at which point the log-analysis systems can be trained using the identified problems. Depending on the use case, this training may be performed manually or automatically.

Manually training a log-analysis system may involve, for example, one or more IT professionals creating a list of log combinations based on their experience. In some instances, IT professionals may review symptoms identified in historical problem reports (e.g., IT help tickets), as well as old log files associated with those problem reports. In these examples, IT professionals may suggest an overall problem with the software system that may have caused the symptoms identified in the problem report. IT professionals may also identify particular events in the reviewed log files that are related to the overall problem. Alternatively, a log-analysis system may be trained to scan the log files reviewed by the IT professional and alert that the overall problem may be occurring when the log-analysis system detects a combination of event entries found in those log files.

Automated training of a log-analysis may involve inputting a log file or multiple log files into a machine-learning system (e.g., a neural network) that is designed to estimate an overall system problem that may cause a particular combination of log events in that log file (or multiple log files) to occur. During training, an IT professional may confirm that the machine-learning system estimated correctly, or that the system should be retrained (by, for example, altering weights and biases of a neural network). Once trained, the machine-learning system may be capable of recognizing a combination of log events that it also recognized during training, and associate that combination of log events with a software-system problem that it was trained to estimate in the presence of that combination.

Because these automated log-analysis and problem-recognition systems typically rely on recognizing exact (or near exact) combinations of log events, they are best suited to software systems that produce a moderate set of predictable events. A moderate set of possible log events may enable a manual trainer or machine-learning system to develop a list of the exact log-event combinations that are associated with particular software-system problems. More complex software systems can produce a high amount and high variety of log events. Thus, the number of possible permutations of log events that could cause the same (or similar) problems can be significantly larger than simpler software systems. Further, the number of possible permutations of log events that might reflect a perfectly healthy system, but may resemble combinations of log events that reflect a system problem, may also be large enough to cause analytical challenges. Unfortunately, this can cause typical automated log-analysis and problem-recognition systems to be inefficient, or even completely ineffective in complex software systems.

For example, some cloud services offer software solutions that utilize a converged software stack. A typical converged software stack may combine several separate software components into one offering. In some use cases, a user client may contract with a software provider (e.g., a cloud provider) to provide a single integrated solution that is specifically adapted for that client's needs. The software provider may then develop that integrated solution by combining many individual software products into one solution (i.e., a software stack). Such integration solutions often require a tremendous amount of back-end development to enable the individual software products to communicate with each other and fulfil the clients needs as a single software package, rather than as a number of individual products with which a client may need to interface.

Further, because the needs of each client may be unique, each converged software stack may include a different set of individual software products and, as a result, different back-end integration and customization to ensure that those software products add up to a single solution that meets the client's needs. In some converged software stacks, the software products may also be of varying complexity and may have been originally developed by different developer teams, or even different companies (e.g., subsidiaries or contractors of the software provider). For these reasons, the logs created by a converged software stack may be both numerous and varied, creating a far more complex set of logs than simpler software solutions. Some converged software stacks, for example, may produce millions of events ever day over a large set of log files. Further, each of these log files may be formatted and updated differently, adding to the difficulty of performing either manual analysis or automated event-combination analysis of the log events of the software stack.

As a result, typical log-analysis and problem-recognition systems that rely on identifying a particular combination of events in logs are not sufficient for some cloud software solutions. Worse, in some converged software stacks, the factors that cause this problem also exacerbate it: because some software stacks produce such a large amount of log events, and because those log events can be from various differently coded products interacting in various ways, some software stacks frequently create log events that appear to be system problems, but are actually innocuous. These false-positive events may be referred to as "event noise." Event noise commonly occurs in converged software stacks because of the amount of interrelated processes that are operating at any given time. Some of these processes may have originally been designed to function in a different environment, with different data, or with different components than they are implemented to function in or with in the converged software stack. Some of these processes, for example, may be hard coded to create alert or error events in situations that normally would be an issue for the processes, but in the converged software stack are reflective of normal operation.

In some instances, individual false-positive events (e.g., innocuous events that appear to indicate a problem) may be easily dismissed. However, when a potential problem is suspected based on a large group of events from separate logs (as is often the case in a converged software stack), the steps of identifying the purported problem and then concluding that the problem is a false positive resulting from event noise (i.e., concluding that the software solution is functioning normally) can be very time consuming. For example, in some converged software stacks, each false-positive event resulting from event noise may be based upon hundreds or thousands of log events in a set of logs that are formatted differently. Further, because of the number of log events created in a converged software stack, event-noise false positives may occur very frequently. Thus, event noise may cause the converged software stack to frequently appear to require attention, even when the system is healthy, which may significantly impact the ability to monitor the health of the software system.

Further, even if event noise could be filtered out or ignored, the actual problems that may remain in a typical converged software stack are often still very difficult to diagnose and solve. This is, again, because of the number and variety of combinations of events that occur regularly in a typical converged software stack. With so many software components interacting, a particular problem may look significantly different to a human reviewer every time the problem occurs.

For example, the same overall system problem may result in a first set of log events the first time that problem is seen, but a completely different second set of log events the second time the problem is seen. Even if the same IT professional is attempting to diagnose the problem on each occasion, the set of logs may look very different on each occasion and may suggest different causes until a significant amount of analysis is performed. Thus, even if the IT professional were able to resolve the problem quickly once the problem is identified, the problem may still take a significant amount of time to resolve due to the analysis that must be performed before the IT professional realizes that it is a problem that he or she has seen before. This issue may be significantly exacerbated if the IT professional is relatively inexperienced at diagnosing issues, particularly in the particular system in which the problem is being seen. Therefore, even in some use cases in which the problems that are not event-noise false positives are typically problems that IT professionals have seen before, the amount of processes occurring and interacting in a converged software stack may cause those problems to require a significant amount of time to solve.

For the above reasons, there exists a need for an IT troubleshooting system that is capable of accurately and efficiently analyzing log events in software system and identifying, without relying on recognizing particular event combinations, when events that represent actual system problems or that the system requires attention are being recorded. These combinations of events may be referred to herein as "anomalies." In some use cases, it may also be beneficial for such a system to be capable of recognizing apparent anomalies that are actually benign events, and categorize them as innocuous event noise. Similarly, once an IT troubleshooting system identifies that an important anomaly is occurring in a converged software stack, there exists a need for an IT troubleshooting system that is capable of reviewing available event logs, classifying the anomaly, and even recommending a solution to the anomaly.

Some embodiments of the present disclosure address some of the above-identified issues by identifying potential anomalies (sometimes referred to herein as anomalous episodes) in a converged software stack based on time-series analysis of aggregated log files from multiple programs/sources. In some embodiments, this anomaly identification may occur on a set of logs that is aggregated from multiple different processes in converged software stack and normalized. In this way, an anomaly can be thought of as a log-file representation of a real-world problem, expressed through log events, that has a single cause or fix. This is because the combination of events from the many log files in a converged software stack may be necessary to uniquely identify the system problems behind the anomalies; as discussed above, events in a single log file may not contain enough information to adequately describe the problem. Further, the anomaly detection may also occur after reducing (or eliminating) event noise from the set of logs. Finally, the anomaly identification may be performed by detecting unusual surges of error events, rather than particular combinations of log events.

For example, some embodiments of the present disclosure aggregate and normalize logs from a variety of software components in a converged software stack. This may include gathering logs together an modifying their formatting to be similar or identical (e.g., converting all date/time stamps to YYYMMDD HHMMSS format rather than, for example, MM DD, YYY HH:MM:SS format). Once log files are aggregated and normalized, they may be easier to analyze together.

Some embodiments of the present disclosure also remove episode noise from the aggregated, normalized logs by identifying surges of log events (i.e., a number of log events that is higher than the typical number of log events by a non-negligible degree) that occur frequently or as part of regular patterns. This may be performed by analyzing the aggregated, normalized logs with an episode mining algorithm. For example, an episode mining algorithm (also referred to herein as a "sequence detecting algorithm") with a sliding window (e.g., a WINEPI algorithm) may analyze the logs over a previous time period (e.g., the past 7 days) to detect repeating patterns in surges of log events. This may identify surges in log events, such as errors or alerts, that may otherwise appear to be problematic episodes. However, due to the frequency or regular pattern in which the surges occur, the IT troubleshooting system may conclude that they are part of the regular operation of the system and are not problematic.

For example, a set of components or processes in the converged software stack may be configured to automatically restart at approximately the same time every 48 hours. When these restarts occur, other components and processes in the software stack may create alert events due to being unable to access those restarting components and processes. Further, the restarting components and processes may also create a large amount of events during this time, due to shutting down and starting back up again. All these combined events may appear to be problematic to an IT professional or a typical log analysis system. However, due to resulting from a planned, periodic event, they are likely to be harmless, and may be removed as noise.

Some components of the present disclosure may, after noise events are removed from consideration, perform time-series analysis on the remaining aggregated, normalized error/alert logs to identify a number of error/alert events at a given time that is above a threshold number that reflects normal system activity. As described herein, a number of these error/alert events that is above this threshold number may be referred to herein as a "surge of events" (or simply an "event surge"), and the threshold may be referred to as a "surge threshold."

For example, a time series analysis algorithm with a 24-hour sliding window may analyze the previous twenty-four hours of error events every minute in real time. In other words, the time series analysis algorithm would analyze the most-recent one minute of events and compare those events with the baseline of event patterns of the previous twenty-four hours. The time series analysis algorithm may detect surges of events that deviate from the normal number of events in a particular time period by a significant amount. For example, the algorithm may identify that a particular 10-minute period exhibits 10 times as many error events as would typically occur during a normal 10-minute period, or that a particular 7-minute period exhibited 8 times as many error events as would normally occur during a normal 7-minute period.

In some embodiments, when a surge of error/alert events is detected, all the logs during the time window that exhibited the anomalous number of error events (i.e., the anomaly window) may be grouped with a report of the anomalous surge. These logs may then be used for diagnosis of the anomaly behind the surge of events. This diagnosis may, in some embodiments, be performed by an IT professional, or by an automated system that is trained to classify detected anomalies.

Some embodiments of the present disclosure may also address some of the above-identified issues by classifying detected anomalies and searching for resolutions of those anomalies based on that classification. These anomalies may be detected by analyses of the present disclosure or by other means.

In some instances, for example, embodiments of the present disclosure may classify a detected anomaly that is identified based on performing a time-series analysis algorithm to detect a surge in error events in an aggregated, normalized set of logs after removing event noise from those logs using a WINEPI algorithm. In some instances, however, embodiments of the present disclosure may classify an anomaly that is submitted with a problem ticket in an IT system after being reported by a user. In each instance, the embodiments of the present disclosure may utilize available logs during the time period that includes the anomaly (i.e., the "anomaly window") to classify the anomaly and attempt to identify a resolution for the anomaly.

Some embodiments of the present disclosure may classify the events in the available event logs (e.g., aggregated and normalized logs for a converged software stack) using a classification algorithm (sometimes referred to herein as an event-classification algorithm). When a problem causes a surge of error events, the problem may be identified based on a departure from the average ontology of the converged software stack's logs, rather than by relying on detection of particular combinations of log events.

For example, some embodiments may analyze an event log that describes a particular virtual machine failover and classify it as a "resource failover." Some embodiments of the present disclosure may utilize a multinomial naive bayes classification algorithm to assign such a classification to each log event recorded by a converged software stack during an anomaly window. However, in some use cases or datasets, other event-classification algorithms may be more accurate or efficient. Thus, some embodiments of the present disclosure may be designed such that the classification algorithm is modular, and could be replaced with another classification algorithm when, for example, a change in the dataset or software stack occurs.

Some embodiments of the present disclosure may also perform natural language processing on the text of a log event in order to prepare it for classification. For example, non-numerical strings in the event log (e.g., "connection to server timed out after 5 seconds") may be converted to numerical vectors before being analyzed by a classifying algorithm.

Some embodiments of the present disclosure may also classify the detected anomaly by analyzing the classified log events using a classification algorithm (sometimes referred to herein as an anomaly-classification algorithm). In some embodiments, for example, a random forest algorithm may analyze the classification of the available log events and, based on the patterns exhibited in those event classifications and the event classifications on which the algorithm has been trained, classify an anomaly that caused a log-event surge or problem identified in an IT ticket. In some embodiments, an anomaly-classification algorithm may, in addition to analyzing the classification of the log events, also analyze the corresponding log events themselves. In some embodiments, analysis of the event classifications (and corresponding events) may allow the identification of a problem behind the log events by classifying an anomaly that could have caused the log events.

For example, an anomaly-classification algorithm may review an error event that is classified as a "disk write fail" by an event-classification algorithm and may review an alert event that is classified as "client credentials rejected" by the event-classification algorithm. A typical IT troubleshooting systems may normally analyze a log event recording a failure to write to disk and conclude that the hard drive on which a write was attempted failed. This may result in wasted resources analyzing the hard drive, and even replacing the hard drive, before realizing that the hard drive is functioning normally. However, embodiments of the present disclosure may conclude, based on the classifications of both of the above log events, that a write to disk failed because a client device's authentication credentials that allow access the server that hosts the hard disk are expired, resulting in a connection failure between the client device and the hard disk. This may cause the server to reject the write command, resulting in the write failure.

Some embodiments of the present disclosure may attempt to identify a resolution for a classified anomaly by searching one or more knowledge corpora for information matching log events that were particularly useful in identifying the anomaly. These particularly useful log events may be referred to herein as "key log events," or "key events." These key log events may be the log events on which an anomaly-classification algorithm based a large portion of the classification of the anomaly. For example, if an anomaly-classification algorithm would classify an anomaly as an "attempted hack on the host server" in the presence of a log-event classification (or group of log-event classifications), but would classify the anomaly as "server network connection is down" or "connection failure due to a switch stuck upgrading its firmware" in the absence of the log-event classification (or group of log-event classifications), the log event(s) that corresponds to those classifications may a key log event(s).

In some embodiments, these key log events may be identified by applying a wrapper to the classification algorithm to observe the log classifications that most directly affect the classification of the anomaly. In some embodiments, for example, model explanation algorithm (e.g., a "LIME" wrapper) may be applied to a random forest algorithm. A model explanation algorithm may analyze the inputs of the classification algorithm to determine the effect that each input had on the output of the classification algorithm. A LIME wrapper, for example, may output the identification of the log event (or event classification) that most significantly affected the classification of an anomaly. In some embodiments, more than one key event may be identified by the wrapper. For example, some wrappers may be configurable to assign a percentage of the classification decision that was based on each log event and identify all log events above a certain standard deviation over the mean percentage.

Some embodiments of the present disclosure may use key log events as a basis for searching knowledge corpora for resolutions to an identified anomaly. For example, some embodiments may search a set of resolution databases for language that matches the language used in the key log event. In some embodiments, this search may be performed by a similarity algorithm. This may identify potential resolutions in the resolution database that contain information that matches information found in the key log events. For example, key log events could be compared to resources found in public IT troubleshooting databases.

In some embodiments, potential resolutions may be described as resources. Resources, as used herein, may refer to journal articles, blog posts, forum posts, articles posted to IT websites, excerpts from software manuals, and other sources otherwise consistent with the spirit and scope of this disclosure. In some embodiments, all resources that were determined by a similarity algorithm to be sufficiently similar (e.g., above a similarity threshold) may be presented to IT personnel for review. In some embodiments, these resources may be sorted based on relevance or expectation of success. These resources may then be viewed by IT professionals, who could then select a resolution to apply to the software system to address the classified anomaly.

In some embodiments of the present disclosure, IT professionals could provide feedback to the system based on whether the results submitted to the IT professionals were accurate. For example, an IT professional could note whether the anomaly was categorized correctly, whether the key log events were actually relevant to the issue affecting the software stack, and whether the provided resolution resources were useful in addressing the anomaly. This feedback may then be used to further train an anomaly classification and resolution system, improving the system's accuracy in the future. For example, where a user categorizes a proposed resource as particularly relevant on multiple occasions, the resolution search algorithm could be trained to recommend that resource more frequently in similar situations (e.g., in anomalies with similar properties). Further, that resource may also be added to a resolution database, which may then be searched separately (or as part of) a set of knowledge corpora to determine whether the prior resolutions would be successful at addressing the current anomaly.

FIG. 1 discloses a method 100 of detecting potential anomalous time periods in a software system, according to embodiments of the present disclosure. These anomalous time periods, as described herein, is a period of time (e.g., a time period measured by a set of logs) in which an anomaly occurs. In other words, an anomalous time period can be thought of as a time period during which a real-world problem with the software system is expressed through log events and recorded. Often, though not always, an anomalous time period overlaps with the real-world time period in which a software problem is occurring. FIG. 1 may be performed by a system that is configured automatically detect when a software stack may be in need of attention from IT professionals. For example, Method 100 may be performed by a computer system such as Computer System 1101 of FIG. 11, which may include a combination of machine-learning models. Method 100 may be performed by a host system of a converged software stack that is responsible for monitoring the health of the software stack.

Method 100, as illustrated, includes processes for identifying event noise over an extended time window, detect surges of error events over a shortened window, determining wither the surge of events is due to event noise, and collecting logs when event surges are due to system anomalies rather than event noise. In some embodiments of method 100, the noise events identified in an extended time window may be removed from the system logs before surges of error events are detected.

Method 100 begins with block 102, in which the host system monitors error logs over an extended window. For example, the host system may monitor the log files for the software products in a converged software stack for the past 7 days and record the number of error events created every minute during those seven days across those log files. In this example, the 7-day window may be referred to as the "extended window." Further, because the host system updates the analysis of the log files each minute, the host system may be characterized as monitoring the system each 1-minute monitoring period over a 7-day extended window.

In some embodiments, the log files monitored in block 102 may be aggregated and normalized by the host system prior to the initialization of method 100. In some embodiments, the log files may be aggregated and normalized as part of method 100. For example, as part of each 1-minute monitoring period, the host system may aggregate and normalize all log files created by the converged software stack over the 1-minute monitoring period and add them to a supply of logs for the past 7 days. In some embodiments, this aggregation and normalization may be performed by a dedicated log insight program, such as a third-party program utilized by the host system. In some embodiments, the log files may be aggregated and normalized before they are obtained by the host system. Further detail regarding the monitoring process of block 102 is provided in FIG. 2.

A host system performing method 100 then proceeds to block 104 in which the host system identifies event noise patterns in the extended window. Block 104 may include, for example, detecting monitoring periods in which a surge of error events occurred and determining whether each surge is part of an identifiable pattern throughout the extended window. As discussed previously, a surge of error events in a monitoring period may refer to a number of error events in a monitoring period that is significantly higher than the number of error events in the average monitoring period. More information regarding identifying a surge of error events is provided in FIG. 2.

Block 104 may analyze the surges of error events using a sequence-detecting algorithm (e.g., a WINEPI algorithm) to determine whether each surge is part of an identifiable pattern. Surges that are part of an identifiable pattern, for example, may occur in monitoring periods that are spaced evenly apart. For example, if the first monitoring period of each calendar day during the extended window (e.g., the first minute after midnight) exhibits a surge of similar size, that surge would be part of an identifiable pattern. Similarly, if a surge of a similar size occurs every two hours during the extended window, that surge would also be part of an identifiable pattern.

In some embodiments, Block 104 may analyze event noise patterns with more granularity. For example, block 104 may, after identifying a surge, determine whether each event in the surge is part of an identifiable pattern over the extended window. Block 104 may categorize only those events that are part of an identifiable pattern event noise. For example, if an event surge included 1,000 error events, a host system may only identify 700 of those error events as event noise, because 300 of those error events may not be part of an identifiable pattern. Extending this further, in some embodiments block 104 may not specifically detect event surges at all, but may analyze each event over the extended window, regardless of whether any particular event was part of an event surge. This may be beneficial to identify periodic patterns of events that are not significant enough on their own to qualify as "surges" of events. Block 104 may include classifying the surges that are part of an identifiable pattern as periodic event noise. Once the surges that are part of identifiable patterns are so classified, the event noise patterns of the extended window are identified.

A host system performing method 100 also monitors error events over a shortened window in block 106. This process may be similar to the monitoring process of block 102, and may overlap with the monitoring process of block 102 as well. For example, a host system performing method 100 may simultaneously record the error events that were created during the most-recent monitoring period in both blocks 102 and block 106. In block 106, those error events may be analyzed with respect to a shorter time window (i.e., the shortened window). For example, rather than analyzing the error events created within the most recent minute (i.e., the monitoring period) with respect to the last 7 days (i.e., the extended window), the host system may analyze the error events with respect to the last 24 hours (i.e., the shortened window). However, the error events analyzed with respect to the shortened or extended window may be the same list of error events, and may be obtained at the same time. In some embodiments, monitoring error events in block 106 may be separate from monitoring log files in block 102. For example, some embodiments of the present disclosure may have different monitoring periods for identifying event noise patterns and for detecting anomalies. Thus, in some embodiments block 102 may be performed every 30 minutes (or, in other words, performed with a 30-minute monitoring period), whereas block 106 may be performed every 30 seconds (or, in other words, performed with a 30-second monitoring period). More information regarding monitoring error events over a shortened window is provided in FIG. 3.

In block 108, the host detects a surge in the error events that were monitored in the most recent monitoring period in block 106. For example, timeseries analysis may be performed on the shortened window (e.g. 24 hours) after event noise events are removed from consideration and anomalies occurring within a detection period (e.g., within the past minute) that differ significantly from the patterns of the events of the shortened window (e.g., the past 24 hours) may be detected and recorded. In some embodiments, this detection may bear a resemblance to the surge detection that was discussed with respect to block 104. However, in some embodiments this detection may be based on analysis that is more specialized for shorter time periods (i.e., the shortened window). For example, a time series analysis algorithm that is more accurate over a 36-hour shortened window rather than 10-day extended window may be utilized. In some embodiments, performing time-series analysis over a shortened time window may allow for more granular analysis of the error events with respect to the window, increasing the confidence that detected surges do indeed represent anomalous conditions in the software stack.

In block 110, the host computer determines whether the surge in error events detected in block 108 is part of the event noise patterns identified in block 104. In some embodiments, the determination in block 110 may be performed in a variety of ways. For example, the noise patterns identified in block 104 may be compared with the surge detected in block 108 to determine whether the surge detected in block 108 could fit within the noise patterns without adjusting the pattern properties. In some embodiments, the surge detected in block 108 may be compared against a list of surges identified in block 104 as event noise. In some embodiments, blocks 102 and 104 may remove any log events that are identified as fitting event-noise patterns and store those log events separate from non-noise log events. In these embodiments, block 110 may be predetermined if the detected surge is not in that separate storage.

If the host determines in block 110 that the surge does fit event noise patterns (i.e., that the surge is event noise), the host proceeds to ignore the surge in block 112. In some embodiments, ignoring the surge may simply include not flagging the surge as an anomaly. In some embodiments, ignoring the surge may also entail storing the error events that comprise the surge in a separate block of storage. In other words, the host system may separate the error events that were determined in block 110 to be event noise from other log events in the shortened window that may be analyzed with error events from future monitoring periods. This may help to prevent event noise from skewing time series analysis that is performed to identify anomalous event surges in the future. After the host ignores the surge in block 112, the host proceeds to end method 100 in block 114.

However, if the host determines, in block 110, that a detected surge does not fit event noise patterns, the host may conclude that the surge represents an anomaly, and proceed to block 116 to determine the extent of the anomaly window. The anomaly window, as referred to herein, describes the period of time during which the anomaly was causing the amount of error logs created by the software stack to be unusually large. In some embodiments, for example, the host system may begin by preliminarily defining the anomaly window as limited to the monitoring period during which the surge was detected in block 108. The host may then determine whether the anomaly window should be broadened by analyzing the amount of error logs in the immediately preceding and immediately following monitoring periods. The host system may broaden the anomaly window if that analysis suggests that the surge actually started in a previous monitoring period, but had not built up to a sufficient level as to be detected, was still building up when detected in block 108, ramps down in subsequent monitoring periods, or is part of a broad surge that spans multiple monitoring periods.

Once the anomaly window is determined in block 116, log files from the anomaly window are collected in block 118. These log files may be labeled as corresponding to an anomaly. In some embodiments, the collected logs may be labeled by a unique anomaly identifier (e.g., a date/timestamp of the anomaly). The logs collected at block 118 may be useful for troubleshooting the anomaly. This may be performed by an IT professional or by a subsequent automated process.

After the logs are collected in block 118, method 100 ends in block 114. As illustrated, method 100 is performed for a single surge event. In other words, method 100 could be practiced during a single monitoring period in which a single surge is detected in block 108. However, in some embodiments method 100 may be repeated in every monitoring period.

As has been previously discussed, in complicated software solutions such as converged software stacks, a large amount of log events from many different sources may combine to create an appearance that the software solution requires attention. For example, periodic alerts from several software products may actually cause a large amount of alert log events to be created due to the number of processes occurring at any given time in a converged software stack. In many cases, those periodic alerts may actually reflect a healthy system, and therefore troubleshooting them may wastes system or personnel resources. For this reason, event surges that occur on a periodic basis may usually be ignored by a system that is configured to automatically monitor the health of a converged software stack.

Figure 2:
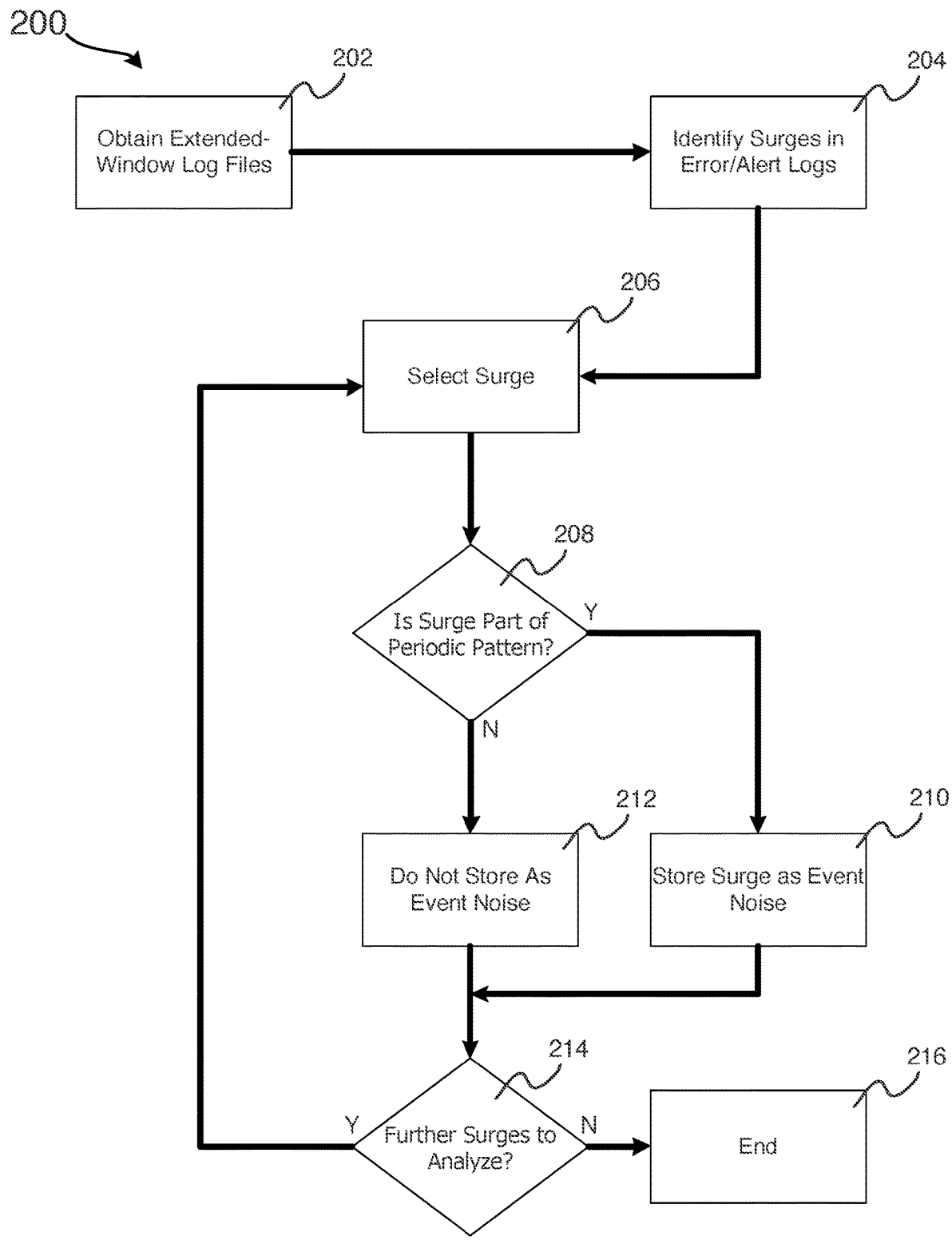
FIG. 2 depicts an example method of removing event noise from anomaly-detection analysis, according to embodiments of the present disclosure.

For this reason, FIG. 2 depicts an example method 200 of removing event noise from anomaly-detection analysis, according to embodiments of the present disclosure. In some embodiments, method 200 may be performed in real time (e.g., at the same time as event logs are being scanned for surges in error events that represent anomalies). In some embodiments, method 200 may be performed proactively. For example, every day a host system performing method 200 may obtain an extended window of log files (e.g., the log files over the past two weeks) and analyze those files for periodic noise patterns overnight. In this example, the extended window may be two weeks, and the monitoring period would be 24 hours. The periodic noise patterns identified by this host system may then be compared against event surges identified in real time to determine whether those event surges are event noise or anomalies. In some embodiments, method 200 may utilize an episode mining algorithm (e.g., a WINEPI algorithm) to identify these periodic noise patterns. For example, a WINEPI algorithm may be used to find repeating patterns in events in obtained log files by identifying surges of error events within those log files that are part of a repeating pattern throughout a time window.

Method 200 begins in block 202, in which log files for an extended window are obtained. As discussed previously, these log files may be aggregated and normalized. This may be performed by the host, a third-party service, or others.

If method 200 were performed in real time, block 202 could involve receiving the log files for the most recent monitoring period (e.g., 15 seconds) and combining them with the remaining log files for the extended window (e.g., 7 days). This "monitoring period" may sometimes be referred to herein as an "identification period." The term "identification period" may be used to describe a monitoring period with respect to identifying event noise, as opposed to detecting system anomalies (e.g., as in block 106-108 of FIG. 1 or as in FIG. 3). However, this distinction is only for the purpose of understanding; in some embodiments an "identification period" may be the same period as a monitoring period used to detect anomalous event surges.

In some embodiments, block 202 may occur while the system is live and actively attempting to detect anomalous surges in events. If, on the other hand, method 200 were not performed in real time, this could involve getting logs for the entire extended window (e.g., 7 days) at once. In some such embodiments, the log files may not actually be for the most-recent extended window. For example, the log files may be for all of April, but may be obtained in block 202 in the fourth day of May. This may reduce the performance requirements of analyzing all log files in the extended window, but may prevent noise from being identified as it occurs.

Once the extended-window log files are obtained in block 202, the host system proceeds to identify surges of error or alert events in block 204. Depending on the embodiment (e.g., whether method 200 is performed in real time), block 204 may include identifying surges throughout the entire extended window, or could identify surges only in the most-recent identification period. These surges could be identified by one of the methods discussed previously, such as comparing the number of events (e.g., error events, alert events, or both) in a particular identification period to the average number of those events throughout the entire window. If the number of events in the identification period is, for example, at least a pre-determined percentage larger than the average number of events throughout the window, then it may be identified as a surge. In some embodiments, a host may analyze each identification period individually in block 204, resulting in a list of all identification periods in the extended window that exhibited an anomalous amount of error/alert events.

Once the host identifies the surges in the error/alert logs in block 204, the host may select one of those surges in block 206 for further analysis. For example, the host may select the most-recent surge that has not been analyzed, the least-recent surge that has not been analyzed, or a surge at random. Once the surge is selected, the host system may determine, in block 208, whether the surge is part of a periodic pattern. In some embodiments, for example, block 208 may simply determine whether a similar surge (e.g., a surge with a similar number of error or alert events) occurs with a frequency over the extended window that is over a threshold frequency. In some embodiments, on the other hand, a more complex analysis may be performed. For example, some embodiments of block 208 may include utilizing a sequence detection algorithm (also referred to as an episode mining algorithm). For example, a host system may utilize a WINEPI algorithm, which may produce rules that describe temporal relationships between the log events analyzed. In some embodiments, this episode mining algorithm may analyze each event within the surge individually to determine whether that event is part of a periodic pattern.

Thus, in some embodiments, block 208 may involve identifying 90% of the events in a surge as part of a periodic pattern, but 10% of the events may be uniquely occurring.

If the system determines, in block 208, that the surge is part of a periodic pattern, the host system stores the surge as event noise in block 210. In embodiments in which periodic patterns are identified on an event-by-event basis, block 210 may apply to only the events in the surge that were identified as part of the periodic pattern. For example, if a surge of 6,000 events is identified at block 206, but block 208 determines that only 2,000 of those events are part of a periodic pattern, block 210 may only store those 2,000 events as event noise. In some embodiments, "storing an event as event noise" may refer to storing the events within the surge separately from other events in the extended window. This may include deleting those events from the corresponding log files, for example. However, in some embodiments the events may be stored in auxiliary log files (i.e., event-noise log files) for future reference. This may be beneficial in instances in which log events were incorrectly identified as noise. In some such embodiments, these event-noise events may be reviewable by, for example, an IT professional to identify events that were incorrectly categorized as part of event noise in block 208.

If, on the other hand, the surge is not determined to be part of a periodic pattern in block 208, the host system proceeds to block 212, in which the host system does not store the events as event noise. In some embodiments, block 212 may simply involve not altering or relocating the event logs that were part of the surge analyzed in block 208.

After block 210 or 212, depending on the result of block 208, the host system proceeds to determine, in block 214, whether there are further surges to analyze in the extended window. In some embodiments, this may include comparing the list of surges that have been previously selected in previous iterations of block 206 with the list of surges that were identified in block 204. If the host system determines that there are further surges to analyze, the host system proceeds to block 206 to select another surge. If, however, the system determines that no further surges remain, method 200 ends in block 216.

The results of method 200 may then be stored for use in subsequent monitoring activities of the software solution. As discussed, some embodiments of method 200 may result in a set of system logs from which error noise events have been removed. This may beneficially enable a host system to quickly recognize that the software solution (e.g., the converged software stack) is running properly. By maintaining a record of the typical patterns that noise events display in the solution's log-event ontology, the system may be capable of more quickly comparing new event surges to the typical patterns to determine whether those new event surges represent problems or noise. This may, therefore, help to prevent waste of resources investigated apparent problems that are not actually problems.

Figure 3:
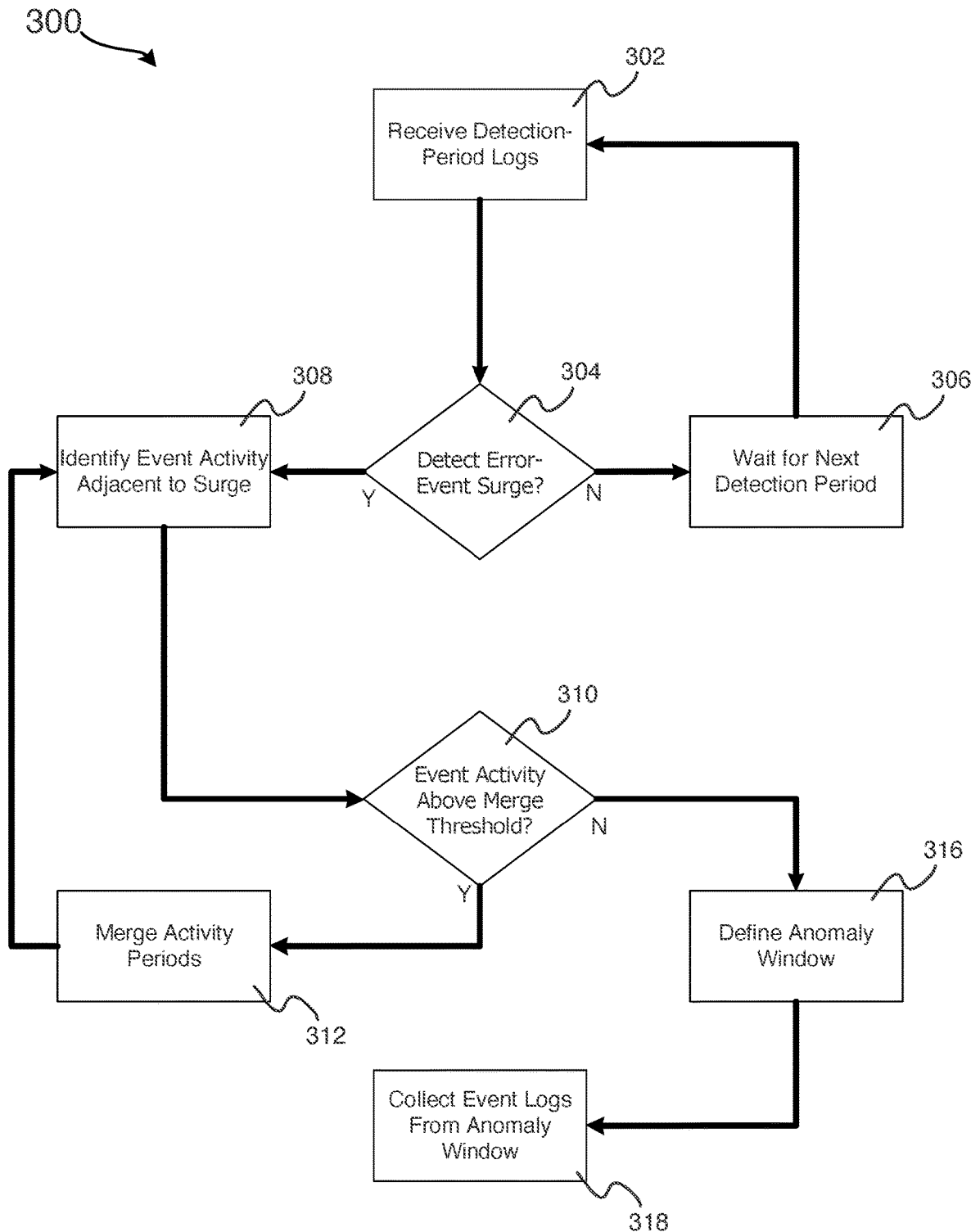
FIG. 3 depicts an example method of detecting anomalous time periods in a software system after removal of event noise, in accordance with embodiments of the present disclosure.

FIG. 3 depicts an example method 300 of detecting anomalous time periods in a software system after removal of event noise, in accordance with embodiments of the present disclosure. In some embodiments, method 300 may be performed immediately after event noise patterns are detected and removed. For example, a host performing method 300 may have just finished performing method 200, and may thus perform method 300 on log events that were not stored as event noise in block 210.

Method 300 begins in block 302 in which detection-period logs are received. As used herein, a "detection period" may be used to describe a monitoring period with respect to detecting anomalous event surges, as opposed to identifying event noise (e.g., as in block 102-104 of FIG. 1 or as in FIG. 2). However, this distinction is only for the purpose of understanding; in some embodiments an "detection period" may be the same period as a monitoring period used to identify event noise.

In some embodiments, the detection-period logs received in block 302 may be aggregated and normalized. For example, a host of a converged software stack may have immediately previously identified event noise within the logs, which may have required aggregation and normalization. In some embodiments, therefore, "receiving" detection period logs may not suggest an actual transfer of the logs to the host from another component, but rather an action by a host to prepare the logs for the remainder of method 300. Similarly, in some embodiments, block 302 may be omitted. Finally, in some embodiments, events that contributed to event noise may have been removed prior to receiving the logs in block 302.

Once detection-period logs have been received in block 302, a host system performing method 300 determines, in block 304, whether an error-event surge is detected in the most-recent detection period. In other words, the host system may utilize time-series analysis to compare the detection-period logs to a time window (e.g., 36 hours) to determine whether the pattern of events in the detection period (e.g., the most recent 2 minutes) deviates from the normal patterns of events in that time window. As previously described, this determination may occur in a variety of ways. For example, in some embodiments a number of error events in the detection period may be compared to a threshold number. If the number of error events is greater than a threshold, a surge may be detected. However, in some embodiments more sophisticated detection methods may be deployed. For example, some embodiments may include utilizing a time series analysis algorithm to analyze the error events in the detection period as compared to the error events throughout a shortened window (e.g., the last 48 hours). Such a time series analysis algorithm may, for example, analyze the error counts per second compared to each second in the last 24 hours. Further, the analysis performed by different time series analysis algorithms may differ based on the design of the algorithm. Thus, in some applications of the embodiments of the present disclosure, some time-series analysis algorithms may be more accurate or efficient than others. For this reason, some embodiments of the present disclosure may treat a time-series analysis algorithm as a modular component, allowing for different algorithms to be tested and selected for the particular needs of a client, dataset, or system-stack architecture.

Some embodiments of the present disclosure may also allow for customization of a time series analysis algorithm based on the preferences of the IT professionals maintaining a system stack or the client for which the system stack is being operated. For example, clients or some IT professionals may desire to establish high requirements for detecting an error-event surge, which may avoid false positives (i.e., non-anomalous events being flagged as event surges for analysis). This may be beneficial, for example, for converged system stacks that do not require 100% uptime and for which high IT support costs are a concern. However, some clients or IT professionals may desire to establish low requirements for detecting an error-event surge, which may avoid false negatives (i.e., anomalous events not being flagged as event surges). This may be beneficial, for example, for converged system stacks that require 100% uptime and for which paying high IT support costs to identify potential false positives is an acceptable tradeoff for avoiding low performance of the software stack.

If the host system determines, in block 304, that an error-event surge has not been detected, the host system proceeds to block 306 in which it waits for the next detection period to occur, at which point it receives updated detection period logs in block 302. However, if the system determines that a surge in error events has been detected, the host system proceeds to block 308 in which the host system identifies the event activity in the system logs adjacent to the surge. For example, the host system may analyze the detection periods immediately prior to the detection period in which the surge was identified in block 304. The host system may identify, for example, whether those other detection periods also have a high number of error events or whether those other detection periods have a high number of other events that may provide insight to the error events within the detection period or to the anomaly as a whole.

In some embodiments, timeseries analysis performed by a host system on the detection-period logs may divide a detection period into many time slices. For example, a detection period of one minute may be divided into 120 half-second time slices. In these embodiments, block 308 may include identifying the particular time slice in a detection period in which an error-event surge occurred, and identifying event activity adjacent to that particular time slice within the same detection period, rather than to the entire adjacent detection period.

Once the event activity in adjacent periods (e.g., the adjacent detection period or the adjacent time slice) is identified, the host system proceeds to block 310 to determine whether the identified event activity is above a merge threshold. Depending on the nature of the event activity identified in block 308 (e.g., only error events were identified, all events were identified, only repeated events were identified), the preferences of the users of the software stack, and the preferences of the IT professionals maintaining the software stack, this merge threshold may take different forms. For example, in some embodiments, the merge threshold may be a required number of error events regardless of other circumstances. In other embodiments, the merge threshold may take a more complicated form, such as a number of events that is determined by multiplying a number of error events identified in block 304 by a merge-threshold multiplier. For example, if a surge of 5,000 error events was detected in block 304, block 310 may include multiplying 5,000 by a merge-threshold multiplier of 0.75, resulting in a merge threshold of 3750. This may be useful in identifying surrounding detection periods that had numbers of error events close to, but not quite high enough to be characterized as a surge. Similarly, multiplying the 5,000 error events by a merge-threshold multiplier of 0.33 would result in a merge threshold of 1,650. This may be useful in identifying surrounding detection periods in which the anomaly had not fully developed, but was in the process of developing. Similarly, multiplying the 5,000 error events by a merge-threshold multiplier of 1.5 would result in a merge threshold of 7,500. This may be useful in identifying subsequent detection periods in which the anomaly continued to develop to create an even larger surge of error events.

Regardless of the form of the merge threshold, if the host system determines in block 310 that the event activity adjacent to the surge (e.g., in the adjacent detection period or the adjacent time slice) is above the merge threshold, the host system proceeds to merge the detection periods in block 312. In other words, the host system may combine the time slice (or detection period) in which the event surge was detected in block 304 with the time slice (or detection period) in which the event activity was determined to be above the merge threshold in block 310. Typically, these two time slices or detection periods would be adjacent, and thus block 312 would effectively increase the duration of an identified time slice or the identified detection period.

For example, if the detection period in which the error-event surge was detected in block 304 was originally 1-minute long, and if the event activity above the merge threshold occurred in the immediately preceding 1-minute detection period, the resulting merged detection period would be 2-minutes long.

In instances in which a sufficient amount of event activity occurred adjacent to a surge, this merging may increase the chances that the system captures the log events that may be necessary to classify the anomaly causing the event surge. For example, if an event surge slowly ramped up over several detection periods, the log events in those ramp-up detection periods may be useful in analyzing the anomaly to determine what, if anything, is malfunctioning with the system. In some instances, anomalous events may also cause several nearby event spikes, but only one of those event spikes may be large enough to be characterized as an event surge in block 304. However, the other spikes may still contain useful log events that may be used to classify the system anomaly causing the spikes.

Similarly, because a merge threshold may consider not only error events, but also alert events, status events, and others, merging in block 312 may capture a large amount of non-error events in adjacent periods that would not be detected as an error event surge but may still contain useful information related to an anomaly. For example, if a surge of error events reporting that a series of components has lost internet connection was detected at block 304, an equally large "surge" of status events indicating that network components connected to those surges were going offline to update firmware may immediately precede the error events (i.e., may be located in the immediately preceding detection period).

Blocks 308, 310, and 312 may loop continuously until the host system determines in block 310 that no nearby detection periods contain event activity above a merge threshold. At that point, the host system defines the merged period (e.g. the set of merged slices or the set of merged detection periods) as the anomaly window in block 314. The "anomaly window" as used herein, describes the window of time during which a system anomaly was occurring and impacting the log files of the system. In instances in which the original detection period from block 302 and 304 was not merged with another detection period in block 312, that original detection period would be defined as the anomaly window in block 314. However, if the original detection period were merged with one or more other detection periods in one or more iteration of blocks 308 through 312, the eventual merged detection period would be defined as the anomaly window in block 316.

In some embodiments, the system may also be configurable to add extra time on either end of the original/merged detection period when defining the anomaly window. For example, the system could add 30 seconds to each end of the detection period, or add an extra one or two detection periods to each end of the detection period. This may increase the likelihood that the anomaly window spans a sufficient amount of time to capture all log events that may be relevant to the anomaly. In some embodiments, whether to add extra time to the detection period may be a user or IT professional preference, and may be configurable as such.

Once the anomaly window is defined in block 316, the event logs from the anomaly window may be collected in block 318. These event logs may then be stored in an aggregated, normalized format to facilitate future analysis of the log events (e.g., categorization of the events). These log events may be stored as individual events, as log files, or in another format. The log events may be appended with an identification of the anomaly window (e.g., a start and stop date/time range) for ease of later identification.

As previously discussed, the methods of FIGS. 1-3 may be useful for monitoring the health of a software system, identifying potential problems (anomalies) with the software system, preventing identifying false-positive problems with the software system, and increasing the likelihood that a sufficient amount of log events related to identified anomalies are stored for diagnostic purposes. Similarly, the methods of FIGS. 1-3 may also be performed in real time, as opposed to some system-monitoring methods, which may require a longer amount of time (e.g., 30 minutes) to detect anomalous activity.

While these benefits may be maximized in a software system that produces a high amount of varied event logs (e.g., a converged software stack) these benefits may also be realized in less complex systems. For example, the methods of FIGS. 1-3 could be practiced in a standard, non-complex software system to avoid the necessity to train a machine-learning system to recognize combinations of particular logs when attempting to detect potential system problems. This may be useful in new systems or small systems in which an insufficient amount of historical training data is available.

Further, the methods of FIGS. 1-3 could be used to develop an automated alerting system for an operator or IT department that is responsible for monitoring the health of a software system. For example, when a system anomaly (based on a non-noise surge of error events) is detected, an IT professional in that IT department could be paged to look into the issue. Because methods 100 and 200 can be used to prevent flagging of anomalies when event surges from event noise occur, such an alerting system could be used to prevent an IT person from being flagged multiple times a day for surges in error events that are reflective of normal system operation. This may reduce costs of supporting the software system due to avoiding wasted hours troubleshooting problems that are actually event noise. Such a system may also be used to train new IT personnel; surges of events stored as event noise could be flagged for their review to enable them to learn to recognize system activity that appears to be indicative of a problem, but is in actuality reflective of healthy system performance.

In some embodiments of the present disclosure, anomalies that have been previously identified as potential system problems may be classified and resolutions for those anomalies can be found. This may be true whether the anomaly was detected based on methods 1-3, for example, or detected by other means (e.g., by a user-submitted IT ticket). In some embodiments of the present disclosure, anomalies may be classified based on the classifications of log events describing the anomalies, and potential resolutions to those classified anomalies may be reported to a user (e.g., an IT professional).

Figure 4:
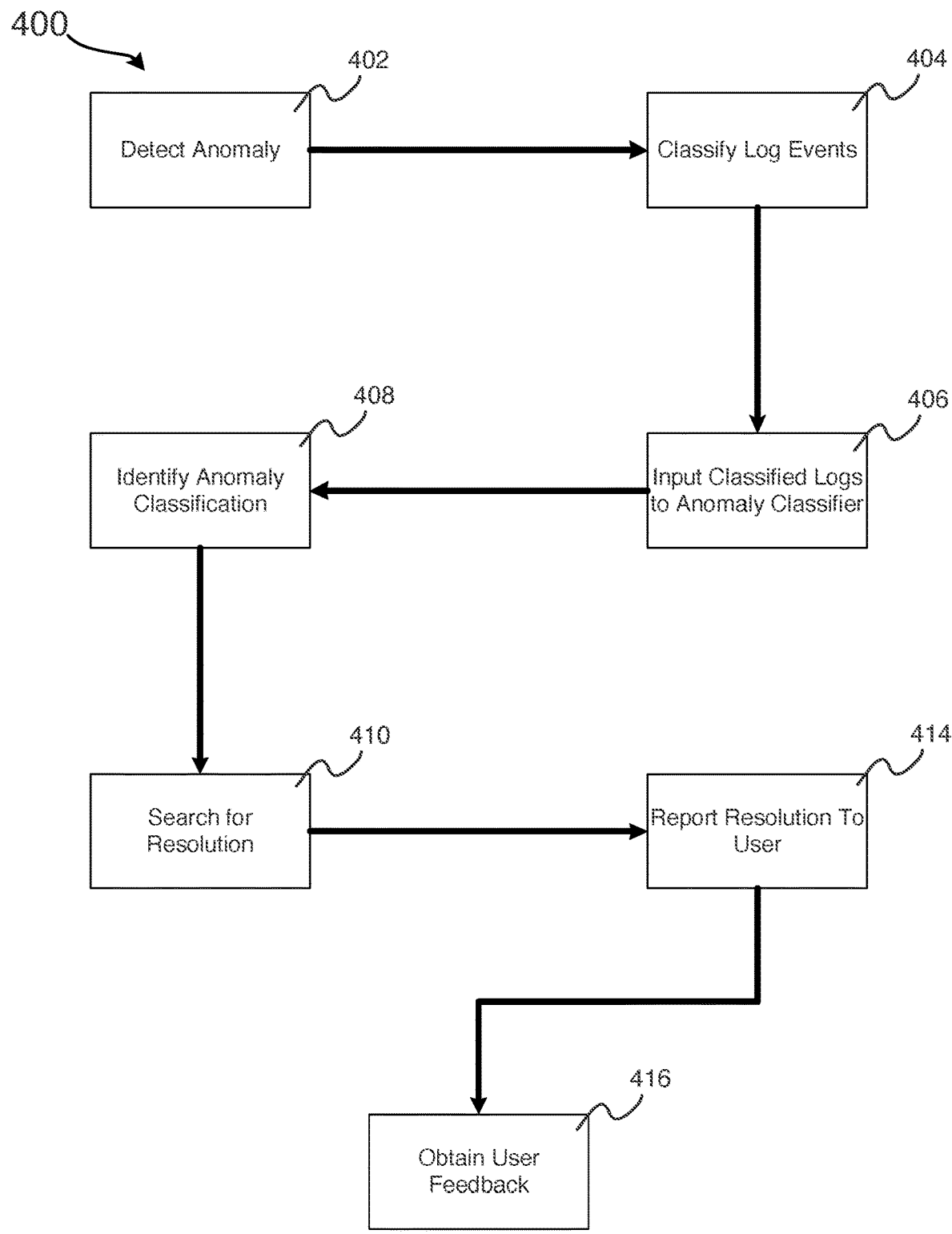
FIG. 4 depicts an example method of classifying and resolving anomalies in a software system, according to embodiments of the present disclosure.

FIG. 4 depicts an example method 400 of classifying and resolving anomalies in a software system, according to embodiments of the present disclosure. Method 400 may be performed by a system that is responsible for monitoring the health of a software solution, such as a host system that is monitoring the health of a converged software stack. For example, method 400 may be performed by computer system 1101 of FIG. 11.

In block 402, the host detects anomaly in the software system. In some embodiments, for example, this anomaly may be detected through method 100 or 300. In some embodiments, the anomaly could be detected after being discovered and reported to the host manually, such as by an IT professional who is overseeing the system and notices low system performance. Similarly, the anomaly could be reported to host manually by a client user of the software system, who may have submitted an IT help ticket when the client user encountered a problem with the system.

In some embodiments, detecting the anomaly may also include receiving event logs associated with the anomaly. For example, detecting the anomaly may also include receiving the log events that were created at the time of the anomaly. When an anomaly is detected due to a client user submitting an IT help ticket, the IT help ticket may include event logs that were attached by the client user or the ticketing system. In some embodiments, detecting the anomaly may include obtaining log events manually. For example, detecting the anomaly may include identifying date/timestamps of the anomaly (e.g., an anomaly window) so that the log events that were created at the time of the anomaly can be obtained.

Once the anomaly is detected in block 404, the log events that were created at the time of the anomaly (e.g., during the anomaly window) are classified. For example, the log events (e.g., error events, alert events, status events) may be input into a log classifier. This log classifier may classify each log event into one or more of several classes based on the content of the log event (e.g., based on the text within the log event). For example, the host system may insert each event log file into a classification algorithm, such as a multinomial naïve bayes algorithm. The classification algorithm may identify each log event in the log file and classify it based on the content of the log event.

This classification algorithm (e.g., the machine learning classification technique) may be selected based on the algorithm's suitability for the software system and dataset. For example, the inclusion of the classification algorithm may be modular, such that multiple classification algorithms may be tested, and the classification algorithm that is most successful in each use case may be utilized in block 404.

The classification algorithm with which the log events are classified may output a list of classified log events. These classified log events may be a brief description (e.g., a few words) of the content of the log event (e.g., "network backup storage failure"). More information on the log event classification is provided in FIG. 5.

Once the event logs are classified, they are inserted into an anomaly classifier in block 406. This anomaly classifier may take the form of a classification algorithm, such as a random forest algorithm. Similar to the log classifier, the anomaly classifier may be selected based on the algorithm's suitability for the software system and dataset (e.g., typical classified log events). The inclusion of the anomaly classifier may be modular, such that multiple classification algorithms may be tested, and the classification algorithm that is most successful in each use case may be utilized in block 406. In some embodiments, every log event that was created during the anomaly window may be analyzed by the anomaly classifier in block 406. In some embodiments, only classified error log events may be input into the anomaly classifier. In some embodiments, only the log-event classifications may be input into the anomaly classifier (e.g., the list of the classifications of all the log events that contribute an anomaly may be inputted into the anomaly classifier). In other embodiments, the log-event classifications and the event logs themselves may be input into the classifier. More information on the anomaly classification is provided in FIG. 6.

The output of the anomaly classifier is an anomaly classification (e.g., "attempted DDOS attack on the host system at Feb. 20, 2021, 14:30"). The host system identifies that anomaly classification in block 408. In some instances, the anomaly classification may provide insight based on the overall topology of the software system than any individual log may provide on its own. In other words, the anomaly classification may be a statement of an overall system problem that takes the overall state of the system into account. For example, errors in two particular storage systems, regardless of the type of errors, may imply a different anomaly classification (e.g., "loss of connection between source and target drive") than either of those errors individually (e.g., "disk failure on target drive").

In block 410, the host system searches for a solution to the underlying problem based on that anomaly classification. For example, the host system may search a resolution database of resolutions that were previously successful at solving similar anomalies. For example, the host system may input the classified log events, the anomaly classification, or both into a cosine similarity algorithm to determine similarities between the log events/anomaly and the prior resolutions. These prior resolutions may be resolutions to anomalies that IT professionals have previously employed and flagged as relevant to the host system. In some embodiments, the host system may also, or alternatively, search a knowledge corpus or a set of knowledge corpora using the information from the log events that contributed to the anomaly classification. The host system may perform a similarity search between particularly relevant log events and the content of those resolution databases for resources that have similar content to the log events. More information on this resolution search is provided in FIG. 7.

In block 412, the results of the resolution search are reported to a user, such as an operator (i.e., an IT professional who is responsible for maintaining the performance of the software system). In some embodiments, this report could include the anomaly classification, the particularly relevant log events that were utilized in the search, and a list of resources or prior resolutions that were returned by the search. The user may review the reported resolution, and provide feedback in block 414. This feedback may then be utilized for retraining various aspects of the host system's ability to classify log events, classify anomalies, and search for resolutions. For example, the host system may analyze the user feedback to determine whether the resources found in the resolution search were helpful to the user, whether the relevant event logs were actually relevant to the problem in the system, whether the anomaly classification was correct, and others. The host system may then retrain the classifiers or search algorithm based on this feedback. The host system may also maintain a database of resolutions resources (e.g., IT support articles, blog posts) that were particularly useful, and may also maintain a database of user-provided resolutions that solved the system problem. These databases may be used in future resolution searches for future system anomalies.

Figure 5:
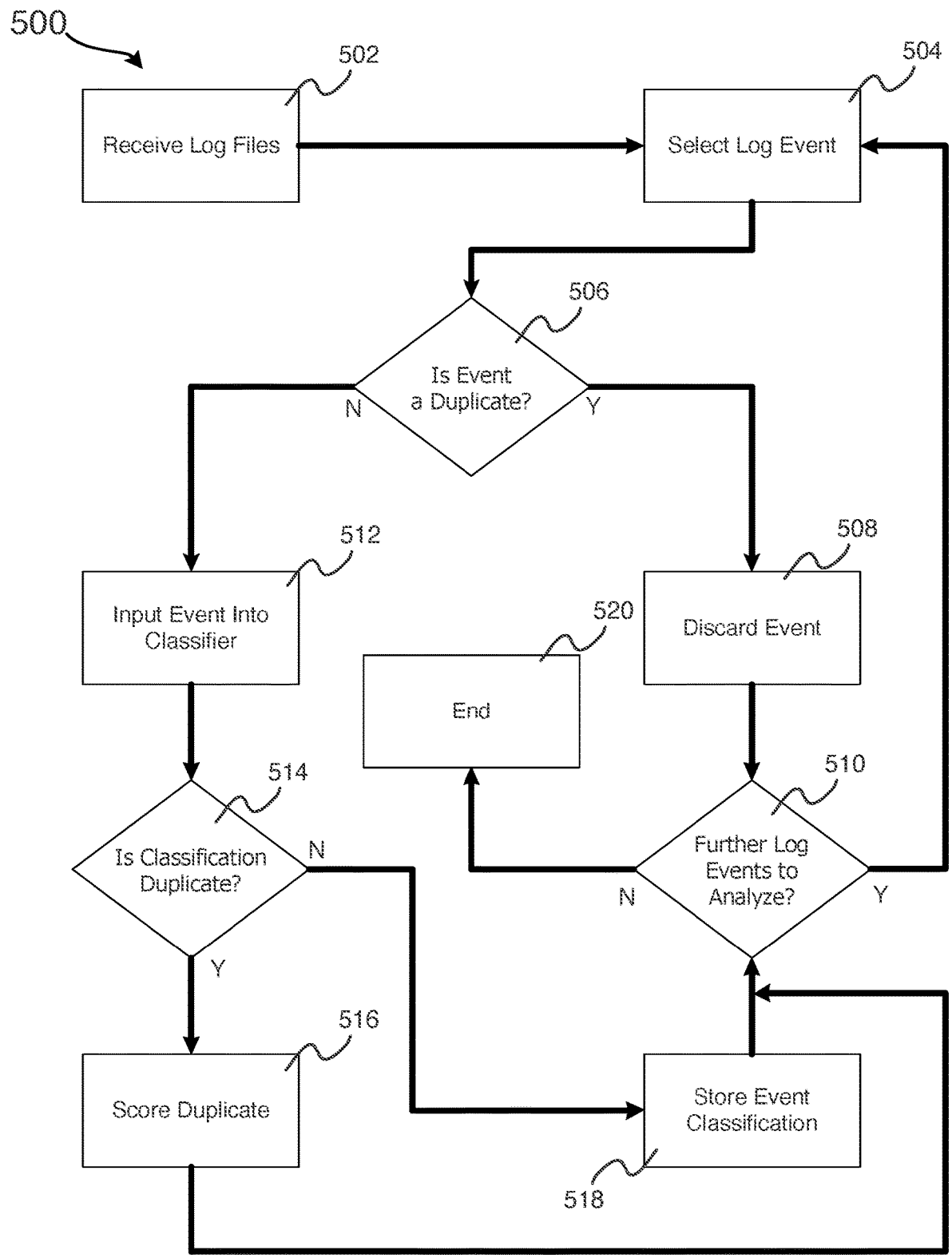
FIG. 5 depicts an example method of classifying events in log files, according to embodiments of the present disclosure.

FIG. 5 depicts an example method 500 of classifying events in log files, according to embodiments of the present disclosure. Method 500 may be utilized in a larger method of classifying and resolving system anomalies, such as method 400. Method 500 may be performed by a system that is responsible for monitoring the health of a software solution, such as a host system that is monitoring the health of a converged software stack. For example, method 500 may be performed by computer system 1101 of FIG. 11.

Method 500 begins in block 502, in which log files for a detected anomaly are received by a host system performing method 500. In some instances, the host system may receive complete log files, whereas in some embodiments only error events in log files may be transmitted to the host system. These log files may be aggregated and normalized, which may aid in the analysis and classification of the log events therein. In some embodiments, the host system may be informed of a detected anomaly occurring within a particular time range. In these embodiments, the host system may fetch the log files for that time range in block 502.

After the log files are received, the host system may select a log event within a log file to classify at block 504. The log event may be selected, for example, chronologically (for example, the least recent log event within an anomaly window may be selected). The host system may then determine whether the selected log event is a duplicate log event in block 506. In other words, the host system may determine whether the selected log event is identical to another log event that has already been classified. If the event is a duplicate, the host system discards the event in block 508. This may include, in some embodiments, making a note of the duplicate event. For example, each event that is classified in method 500 may include a metadata flag attached to it that indicates the number of instances of that event in the anomaly window. This may be useful when classifying the anomaly (for example, in FIG. 4 or FIG. 6).

Once the duplicate log is discarded in 508, the host system determines whether there are further log events to analyze in block 510. This may include log events in the same log file, or other log files. If there are further log events to analyze, the system returns to block 504 to select a log event and block 506 to determine whether the event is a duplicate. If the event is not a duplicate, the log event is inserted into a classifier in block 512. This classifier, for example, may take the form of a multinomial naïve bayes algorithm. In some embodiments, this classifier is trained by inputting historical data (e.g., existing log events that users have previously classified) into the classifier. The classifier may have been further trained as the system is run in real time, as discussed further in FIG. 7. In some embodiments, the classification of the log event may include performing natural language processing on the log-event text prior to classification. Thus, the log classifier may, in some embodiments, include a natural-language processing algorithm as well. Similarly, while blocks 504-510 are described herein as being performed by the host system, in some embodiments these blocks may also be part of a log classifier. Thus, some embodiments of the present disclosure may input a set of log files into a classifier algorithm immediately after receiving log files (for example, immediately after block 502. The log classifier, in these embodiments, may select a log event and determine whether it has classified the event before.

The log classifier may then classify the inputted log event(s) based on the text therein. The log classifier may output, for each classified log event, a short classification of the event (e.g., "network security event," "I/O write fail; network storage"). The host system may receive this classification in block 514 and determine whether it is a duplicate classification. A duplicate classification may occur, for example, if two different log events were analyzed by the classifier in block 512 and were classified with the same exact classification. If the host system determines that the classification is a duplicate, the host system may proceed to block 516 in which the duplicate is recorded (i.e., "scored"), which may be useful information when developing an anomaly classification. In some embodiments, scoring the duplicate log classification may also include storing the classified log event for analysis when classifying an anomaly. In other embodiments, scoring the duplicate classification may include discarding the duplicate classified log event.

If, on the other hand, the host system determines in block 414 that the classification is not a duplicate, it may store the event classification in block 518. In some embodiments, storing the event classification may also include storing the classified log event, and even the entire log file in which the classified event is found.

The host system proceeds from either blocks 516 or 518 to block 510, in which the host system determines whether there are any further log events to analyze. In some embodiments, this determination may involve determining whether any log events have not yet been inserted into the classifier. If the system detects further log events, the system returns to block 504 to select another log event to be classified. If the system does not detect further log events, the host system ends method 500 in block 520.

In some embodiments, a user (e.g., an IT professional) may review the classifications of the events as part of method 500 and determine whether the classifications are accurate. When classifications are inaccurate, the IT professional may provide feedback to the host system that could be used to retrain the log classifier for future iterations.

Figure 6:
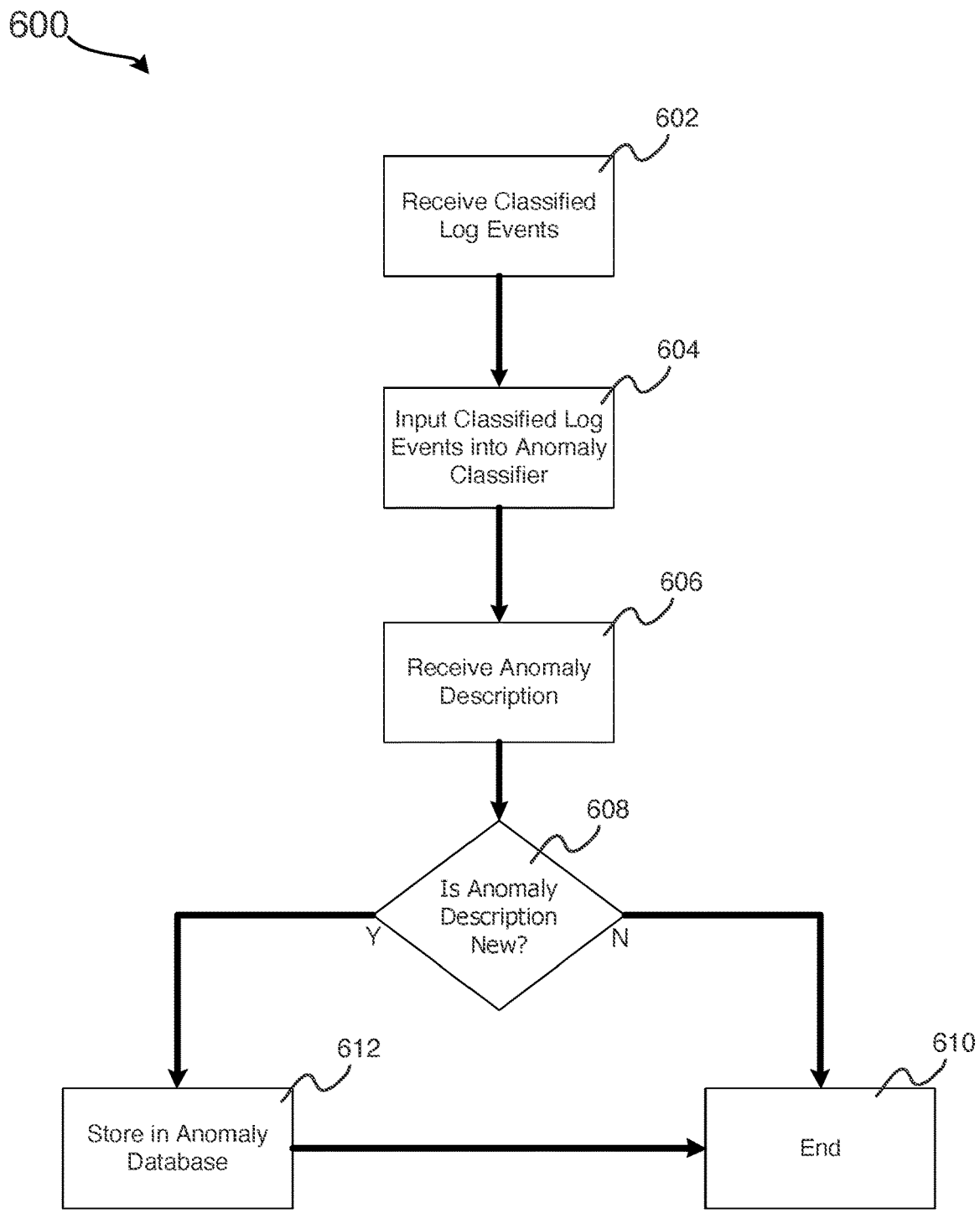
FIG. 6 depicts an example method of classifying an anomaly in a software system, according to embodiments of the present disclosure.

FIG. 6 depicts an example method of classifying an anomaly in a software system, according to embodiments of the present disclosure. Method 600 may be utilized in a larger method of classifying and resolving system anomalies, such as method 400, and may be performed in sequence with method 500. Method 600 may be performed by a system that is responsible for monitoring the health of a software solution, such as a host system that is monitoring the health of a converged software stack. For example, method 600 may be performed by computer system 1101 of FIG. 11.

Method 600 begins at block 602, in which the host system receives classified log events. These classified log events may be received, for example, from a log classifier, such as a log classifier utilized as part of block 404 or block 512. In some embodiments, the classified log events may include the log events to which those classifications apply. In some embodiments, the log files in which those log events were created may also be received in block 602. In some embodiments, however, only a list of log-event classifications may be received in block 602. The specific format of the classified log events received in block 602 may depend on the configurations of the log classifier that classified the log events and the anomaly classifier into which those classified log events input in method 500.

In block 602, the host system inputs the received classified log events into an anomaly classifier. The anomaly classifier may take the form of a classification algorithm that is chosen based on the specifics of the software system (e.g., a converged software stack). For example, the specific customer (i.e., client) preferences, number of log events produced in an average minute, dataset type, and host-system specifications may all impact the particular classification algorithm that may perform with the highest efficiency and accuracy. Thus, the integration of the anomaly classification algorithm may be modular such that multiple algorithms may be tested, and the most satisfactory algorithm adopted.

In block 606 the host system receives the output of the anomaly classifiers: one or more descriptions (i.e., classifications) of the system anomaly (or anomalies, in some instances). For example, where error log events showed potential issues related to network performance, the anomaly classifier may output a classification that "a remote actor is performing a DDOS attack on the system" or "someone is trying to hack into the network firewall between a backup server and the internet" depending on the overall topology of the log event classifications input into the anomaly classifier. Similarly, where error log events showed potential issues related to a write attempt to a remote storage drive failing, the anomaly classifier may output a classification that "the client's password to the storage-drive host is out of date," "the internet connection at the storage drive location is down," or "an intermediate component between the client and the storage drive has queued the write command due to an update to the storage drive."

In some instances, multiple anomaly descriptions for multiple anomalies may be received in block 606. This may occur, for example, when multiple independent anomalies are affecting the software system, at the same time. This may be beneficial in that multiple independent system anomalies are not mistakenly treated as a single anomaly. This could, for example, prevent an IT profession from spending time trying to determine how to solve one large problem that is really two unrelated anomalies. In other words, it would prevent the IT team from going on a wild goose chase to figure out why the symptoms of the independent anomalies are related.

In some embodiments not depicted in FIG. 6, a host system may end method 600 after method 606 once the anomaly description(s) is(are) received. However, in some embodiments the results of 606 can also be analyzed to determine if it could be used in later, separate attempts to retrain the anomaly classifier. For example, in some embodiments, the ability of the host system to identify two independent anomalies may be facilitated if those anomalies have been classified by the host system previously. Similarly, the host system may learn from previously classified anomalies, which may increase the ability of the host system (or the anomaly classifier therein) to classify those anomalies again in the future. For that reason, the host system may determine, in block 608, whether the anomaly description received in block 606 is new to the host system, or if the host system has received that anomaly description from the anomaly classifier previously.

If the host system has received the anomaly description from the anomaly classifier previously, the host system ends the method in block 610. However, if the host system has not received the anomaly description from the anomaly classifier previously, the host system stores that anomaly description in an anomaly database in block 612. This anomaly database may be useful to help the anomaly classifier quickly and efficiently identify those anomalies faster in the future, and identify when those anomalies are occurring simultaneously with other system anomalies. In some embodiments, the anomaly database may also store particularly relevant log events (also referred to herein as "key log events") or other information to help the host system, IT personnel, or the anomaly classifier recognize the anomaly in the future. These recognized anomalies may also be used to occasionally retrain the system (e.g., the anomaly classifier).

Once the anomaly description is stored in the anomaly database, the host system ends method 600 in block 610. In some embodiments, block 610 may also include preparing the anomaly description, the classified log events, the log events or log files themselves, or a combination thereof for a resolution search. In some embodiments, the anomaly description may be provided to an IT professional for manual troubleshooting. In other embodiments, the anomaly classification may be provided to a search algorithm for automatic resolution searching.

As has been previously discussed, most system problems (i.e., anomalies) that are not as a result of event noise are problems that IT professionals may see regularly when maintaining the health and performance of a complex software system. However, in particularly complex software systems, such as converged software stacks, these problems may nevertheless be difficult to recognize without significant investigation. This is due to the large number of processes interacting at any given time in a converged software stack; when a system problem occurs, it may affect different processes in different ways than when the same exact problem occurred in the system previously, and therefore each instance of a problem in the system may result in different systems and different log events.

However, there is a non-negligible likelihood that the problem has occurred in the software system (or a similar software system) before, and therefore a non-negligible likelihood that there is also an acceptable solution for the problem available. However, without the methods of the present disclosure, IT personnel may perform significant investigation before determining that a previous solution is available to solve present issues with the system. Similarly, the embodiments of the present disclosure may also be used to assist an IT professional in quickly locating that past solution, avoiding any misplaced troubleshooting time.

Figure 7:
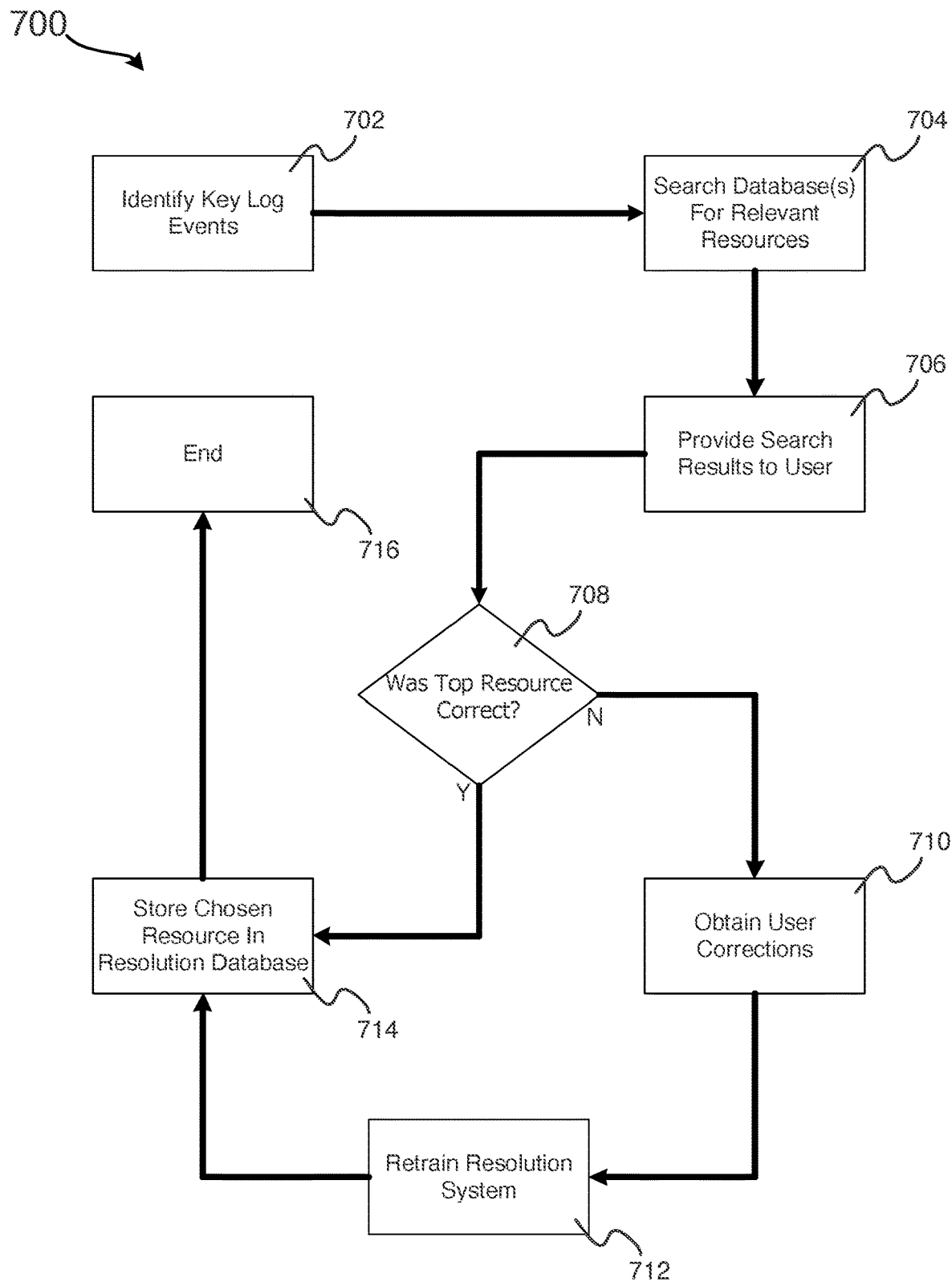
FIG. 7 depicts an example method of identifying a resolution to an anomaly in a software system, according to embodiments of the present disclosure.

FIG. 7 depicts an example method 700 of identifying a resolution to an anomaly in a software system, according to embodiments of the present disclosure. Method 700 may be utilized in a larger method of classifying and resolving system anomalies, such as method 400, and may be performed in sequence with method 600. Method 700 may be performed by a system that is responsible for monitoring the health of a software solution, such as a host system that is monitoring the health of a converged software stack. For example, method 700 may be performed by computer system 1101 of FIG. 11.

Method 700 begins in block 702, in which a key log event (or key log events) for a classified anomaly are identified by the host system. This anomaly may, for example, be an anomaly classified by an anomaly classification algorithm in block 406 of method 400 or block 604 of method 600. A key log event, as used herein, is a log event that was created during the anomaly window and that is particularly representative of the anomaly. For this reason, the key log event is likely to be useful when searching for a resolution to the anomaly.

In some embodiments, the key log event(s) may be identified using a model explanation algorithm, such as a LIME wrapper, applied to the classifier that classified the anomaly. Wrappers are often used to provide insight on the decisions made by machine-learning algorithms such as classifiers. Thus, a wrapper may be configured to identify the logs that were influential in the anomaly classification. Wrappers are particularly useful for the present disclosure, because the same wrappers may be applied to several different machine-learning algorithms (e.g., anomaly classifiers) without significant development. Thus, a wrapper may be applied to an anomaly classifier as part of block 702 in an embodiment in which the anomaly classifier is integrated into the system in a modular fashion, such that the particular classifier used may change over time.

As discussed, in some instances a single key log event may be identified in block 702. However, in some embodiments multiple key log events may be identified. In some embodiments, the important consideration is whether the identified key log events are outliers. Thus, in some instances a single key log event may have been significantly more influential in an anomaly classification than other log events, in which case a single key log event may be identified in block 702. However, in some embodiments multiple log events may have contributed to the classification approximately equally, but all log events in the group may have been significantly more influential than log events not in the group. In these instances, all log events in the group may be identified as key log events.

In some instances, a wrapper may produce a continuum of log events, such that no single log event or group of log events is a significant outlier. In these situations, the most-influential log event may be identified as the key log event. If the key log event does not produce satisfactory resolutions, the top 5 log events in the continuum, for example, may then be identified as key log events.

Further, in some instances, multiple log events may be necessary to get a complete picture of the anomaly. For example, as described above, two (or more) log event classifications, when considered together, may result in a completely different anomaly classification (and thus resolution) than they would when considered separately. When this is the case, each of the log events corresponding to those log event classifications may be identified as a key log event.

Once the key log events are identified, the host system searches one or more databases (e.g., an unstructured knowledge corpus, a database of previously successful resolutions) in block 704 for resources that may be relevant to resolving the anomaly. For example, searching a knowledge corpus may include performing term frequency-inverse document frequency on the references in the corpus database or the key log events to estimate the importance of each term in each reference or log event. With this information, a similarity algorithm can be used to effectively find references that are similar to key log events based on the important terms of the key log events and of the references, rather than based on unimportant terms.

Further, in some embodiments, block 704 may also include comparing the classified logs, the detected anomaly, or both to a database of resources that were previously used to address event anomalies (i.e., a "resolution database"). This resolution database may include resolutions previously created by IT professionals to address event anomalies or resources presented to and selected by users during prior system anomalies. In some embodiments, for example, this may involve using a similarity algorithm, such as a cosine similarity algorithm, to find documents that are similar to an anomaly classification based on identifying each term in the anomaly classification, assigning each term a dimension in a vector, and determining how similar that vector is to the corresponding vectors of references located in a resolution database.

Thus, multiple resolution databases may be searched in block 704. For example, a database containing a collection of articles and posts from IT troubleshooting websites and other IT resources may be searched. A database of previous resolutions that have worked for similar system anomalies may also be searched. For example, the host system may have access to a list of articles/references that have successfully been applied in software systems similar to the present software system, particularly if those software systems were also operating the methods discussed in the present disclosure. The host system may also maintain a database of resolution references that have been applied in the present software system. Some of the resolutions in this database may be resolutions that the host system has previously provided to IT professionals to solve anomalies similar to the present anomaly. Finally, the host system may maintain a database of resolution references that personnel who maintain the present software system (e.g., IT professionals) have provided to the host system as part of retraining. This database may contain resolution resources (e.g., articles and other references) that IT professionals have selected, edited, or created to address prior system anomalies of the present software system.

Once the host system searches the database(s) in block 704, the host system provides the search results to the user in block 706. As previously discussed, this user may be an IT professional who is responsible for maintaining the performance and stability of the software system (i.e., a system operator). In some embodiments, for example, block 706 may include providing a list of resources found in the search from all searched databases. These resources may be presented in a ranked format. For example, the similarity algorithm with which the databases were searched may rank the search results based on a confidence value. The confidence value may reflect that algorithm's confidence that the particular reference is likely to resolve the anomaly.

In some embodiments, these resources may also be filtered or organized. For example, the host system may discard any resource that is returned by a similarity algorithm (for example, after term frequency-inverse document frequency) with a confidence level below a threshold (e.g., 80% confident). This may beneficially avoid overwhelming IT professionals with resolution resources that are unlikely to be applicable to the anomaly. The host system may also categorize the search results based on the database in which those search results were found. For example, the host system may return one list of ranked resources that were found in a knowledge corpus of public resources, a second list of ranked resources that were found in a resolution database of resources that have been used in the software system in the past, and a third list of ranked resources that were found in a resolution database of resources that IT professionals may have customized or created. In some embodiments, the host system may select a single resource that has the highest confidence value (i.e., that is ranked the most likely to successfully address the system issue), and flag that resource to the user. This resource may be referred to herein as the "top resource."

In block 708, the host system receives feedback from a user regarding whether the top resource actually addressed the issue. If the user (e.g., an IT professional) applied the resolution from the top resource to the software system and the anomaly was addressed (e.g., mitigated, eliminated), the user may provide feedback that the top resource was correct. However, if the user applied the resolution from the top resource and the anomaly was not addressed, or if the user realized that the top resource would not address the anomaly even before applying it, the user may provide feedback that the top resource was not correct.

If the host system receives feedback in block 708 that the top resource was not correct, the host system obtains suggested user corrections in block 710. For example, because the top resource was apparently incorrect, the host system may request that an IT professional provide the host system with an identification of the resource from the search results that addressed the anomaly. In some instances, however, no resource from the search results provided in block 706 may have sufficiently addressed the anomaly. In these instances, an IT professional may submit a customized resource to the host system. This customized resource, for example, may be a set of instructions to address the anomaly that the IT professional has altered in order to fit better with the software system. Alternatively, an IT professional may have, upon seeing the anomaly classification, realized how to resolve the anomaly based on the IT professional's prior experience with the anomaly. In this instance, the IT professional may have developed a resolution from scratch, and may submit that resolution to the host system.

In some instances, the user corrections obtained at block 710 may imply that the other resources were significantly incorrect, or that the key log event identified at 702 was not correct. In some instances, an IT professional may even explicitly provide that feedback. In these instances, the host system may make a record of the inaccuracies (e.g., by flagging all incorrect references or key log events) for later retraining purposes.

After the host system obtains the user corrections in block 710, the host system retrains the resolution system in block 712 with the user corrections. The type of retraining performed in block 712 may depend on the user corrections received at block 710. For example, in some instances the user may have provided a customized or user-created resolution, in which case the host system may retrain the search algorithm with the provided resolution. Similarly, if the user flags the key log event as not accurately reflecting the actual system anomaly, the host system may adjust the wrapper that is used to identify key logs, or even may retrain the anomaly classifier.

After obtaining the user corrections in block 710, the host system also stores, in block 714, the resource that the user chose as a resolution in a resolution database. Similarly, if the user provides feedback in block 708 that the top resource was correct, the host system stores, in block 714, the top resource in the resolution database as the chosen resource. This resolution database may then be used as a resolution database in block 704 for future iterations of method 700 to resolve future anomalies. This may be particularly useful if the same anomaly classification is detected in the future, as the chosen resource could then be selected as a top resource based on the prior success of the resource in addressing that anomaly. Similarly, this database may also be useful for periodic retraining of the resolution system. Once the chosen resource is stored in the solution database, the host system ends method 700 with respect to the particular anomaly in block 716.

As has been discussed previously, a machine-learning model, such as a classifier or natural-language-processing algorithm, may process and analyze input data (here, for example, log files, log-event classifications, log events, etc.) by recognizing patterns in the input data and comparing those patterns to patterns related to historical outputs (e.g., log classifications, anomaly classifications, resolution resources) on which the model has been trained. For example, a classifier may recognize several patterns in the data expressed by an input vector for a particular system anomaly. The classifier may then associate some of those patterns with the patterns associated with historical anomaly classifications that the classifier has been trained (e.g., by human-supervised training or automatic training) to classify the system anomaly.

In some embodiments, data input into a classifier may take the form of a vector. A vector may be a one-dimension matrix (e.g., a matrix with one row and many columns) of numbers, each of which expresses data related to, for example, numbers of error events in a detection period or a classification of a set of log events. A vector may also be referred to herein as an "input vector," a "feature vector," or a "multi-dimension vector." For example, as previously discussed, this vector may include a number of error events in a monitoring period, a set of log events, a log-event classification that has been converted to number format, or others.

Figure 8:
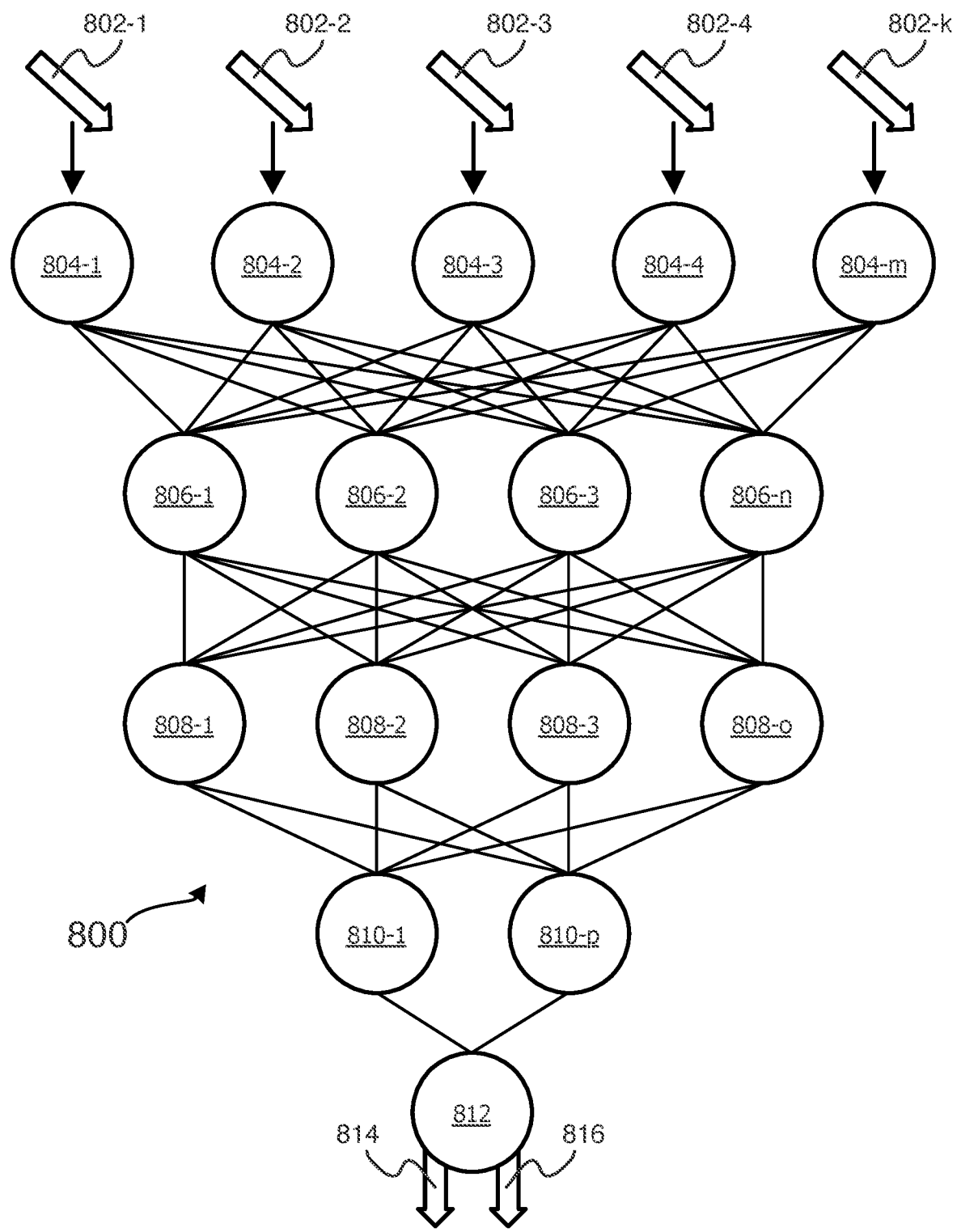
FIG. 8 illustrates the representative major components of a machine-learning classifier that may be used in accordance with embodiments.

Such a machine-learning model is illustrated in FIG. 8. In FIG. 8, model 800 may be trained to classify a log event or anomaly. The inputs of model 800 are represented by feature vectors 802-1 through 802-$k$. These feature vectors may contain the contents of log files or log classifications. In some embodiments, feature vectors 802-1 through 802-$k$ may be identical copies of each other. In some embodiments, more of instances of feature vectors 802 may be utilized. The number of feature vectors 802-1 through 802-$k$ may correspond to the number of neurons in feature layer 804. In other words, in some embodiments, the number of inputs 802-1 through 802-$k$ (i.e., the number represented by m) may equal (and thus be determined by) the number of first-layer neurons in the network. In other embodiments, model 800 may incorporate 1 or more bias neurons in the first layer, in which case the number of inputs 802-1 through 802-$k$ may equal the number of first-layer neurons in the network minus the number of first-layer bias neurons.

Feature layer 804 contains neurons 801-1 through 801-$m$. Neurons 804-1 through 804-$m$ accept as inputs feature vectors 802-1 through 802-$k$ and process the information therein. Once vectors 802-1 through 802-$k$ are processed, neurons 804-1 through 804-$m$ provide the resulting values to the neurons in hidden layer 806. These neurons, 806-1 through 806-$n$, further process the information, and pass the resulting values to the neurons in hidden layer 808. Similarly, neurons 808-1 through 808-$o$ further process the information and pass it to neurons 810-1 through 810-$p$. Neurons 810-1 thorough 810-$p$ process the data and deliver it to the output layer of the model, which, as illustrated, contains neuron 812. Neuron 812 may be trained to calculate two values—value 814 and value 816. Value 814 may represent the likelihood that an anomaly matches a particular anomaly classification. Value 816, on the other hand, may represent the likelihood that the anomaly does not match the particular anomaly classification. As such a host system may operate a separate classifier 400 for each anomaly classification (or log event classification) for which it has been trained.

In some embodiments, model 800 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 812 may be used to classify an anomaly in a software system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
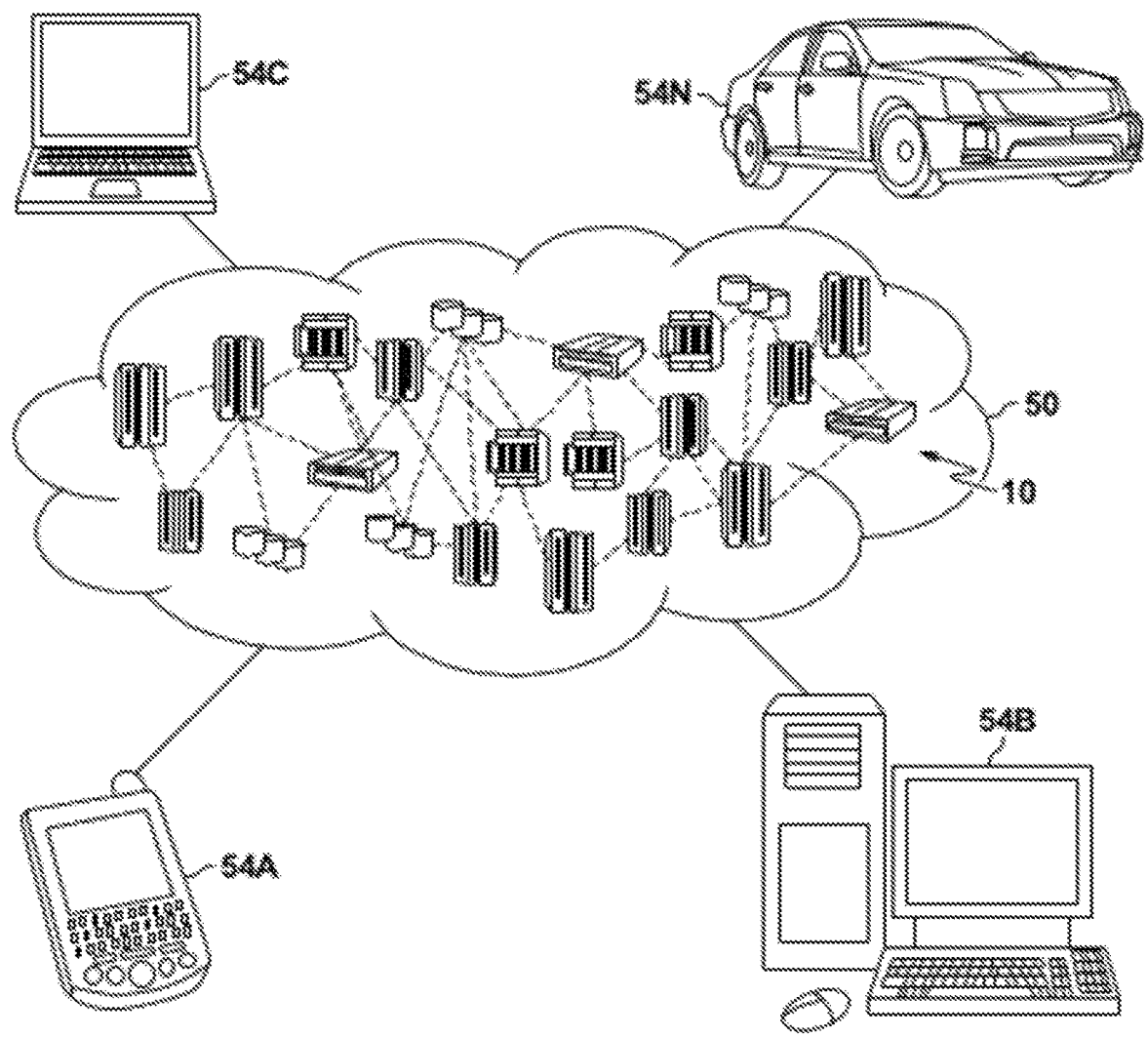
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
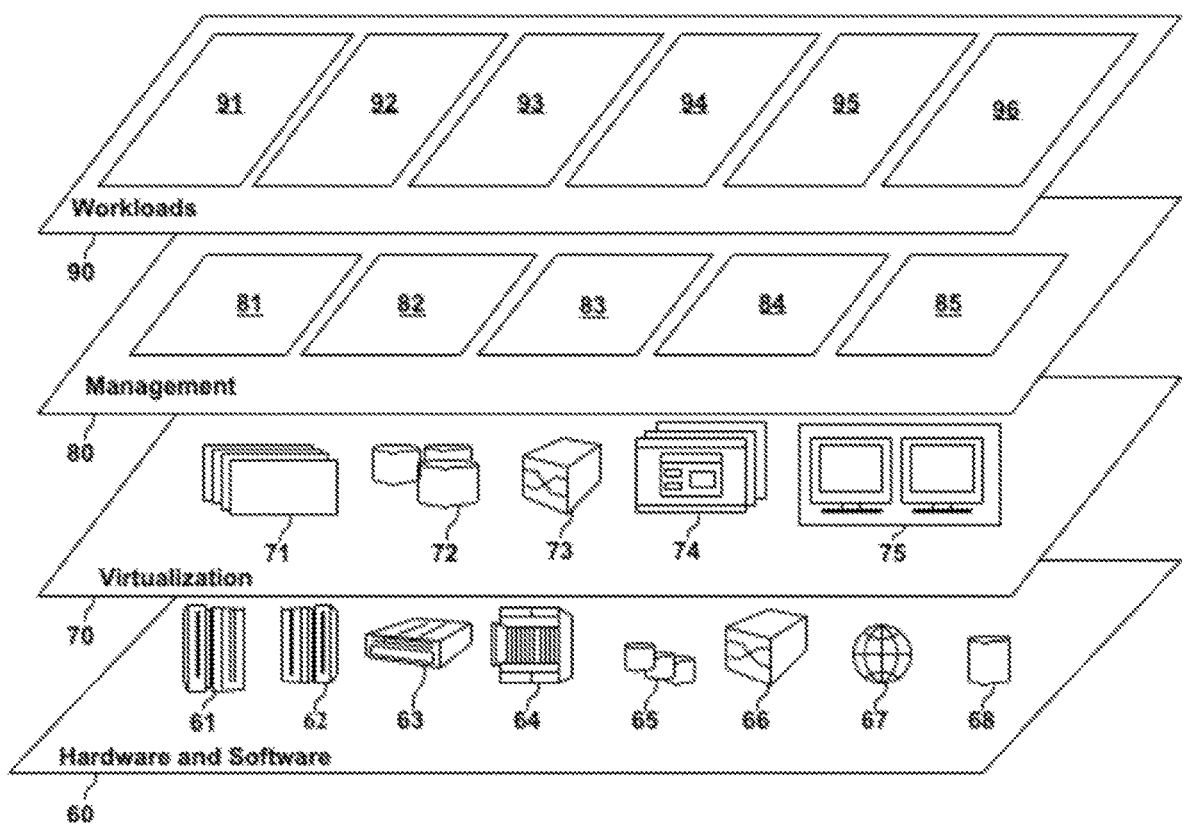
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software stack hosting and troubleshooting 96.

Figure 11:
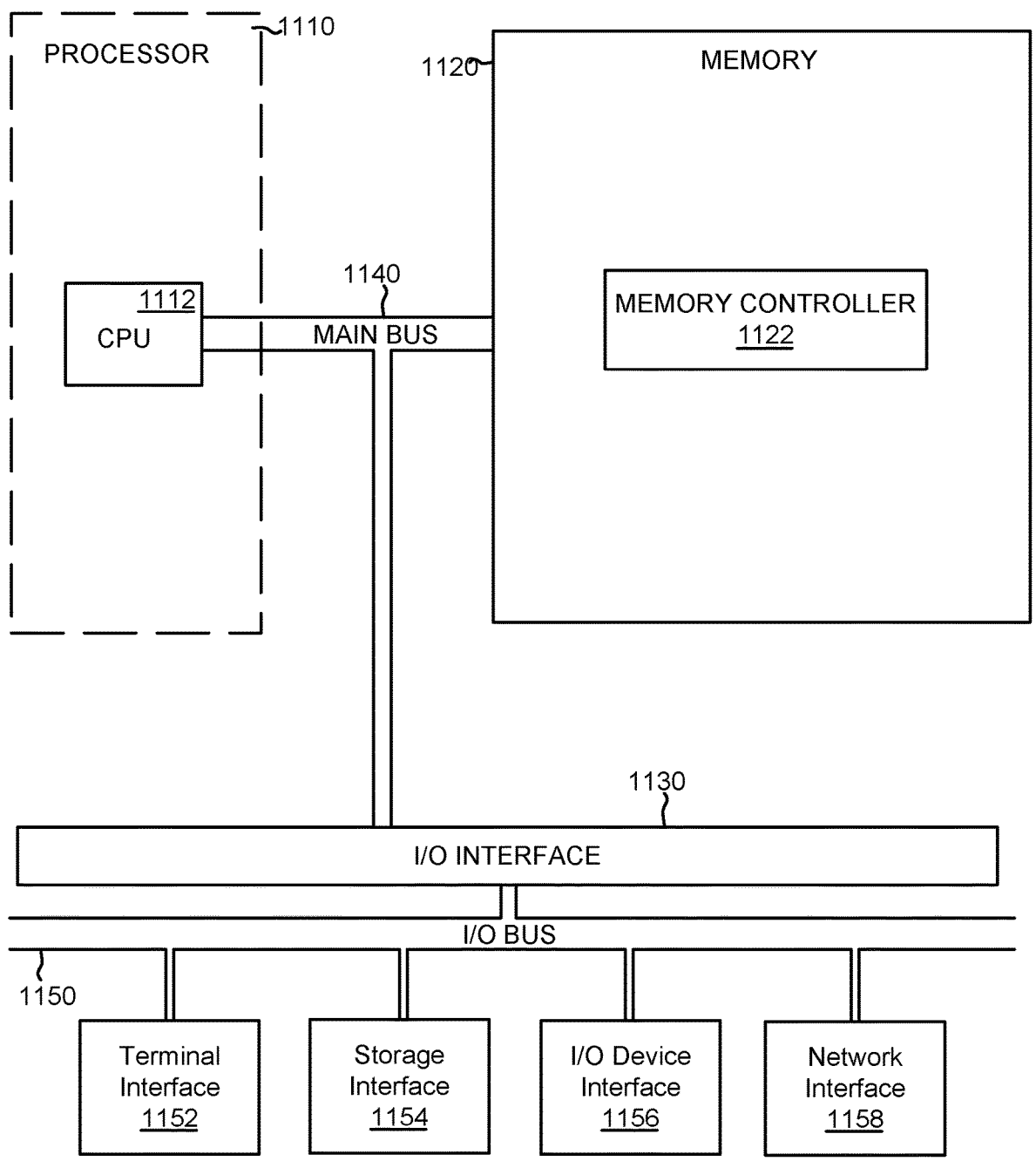
FIG. 11 depicts the representative major components of a computer system that may be used in accordance with embodiments.

FIG. 11 depicts the representative major components of an example Computer System 1101 that may be used in accordance with embodiments of the present disclosure. The particular components depicted are presented for the purpose of example only and are not necessarily the only such variations. The Computer System 1101 may include a Processor 1110, Memory 1120, an Input/Output Interface (also referred to herein as I/O or I/O Interface) 1130, and a Main Bus 1140. The Main Bus 1140 may provide communication pathways for the other components of the Computer System 1101. In some embodiments, the Main Bus 1140 may connect to other components such as a specialized digital signal processor (not depicted).

The Processor 1110 of the Computer System 1101 may include one or more CPUs 1112. The Processor 1110 may additionally include one or more memory buffers or caches (not depicted) that provide temporary storage of instructions and data for the CPU 1112. The CPU 1112 may perform instructions on input provided from the caches or from the Memory 1120 and output the result to caches or the Memory 1120. The CPU 1112 may include one or more circuits configured to perform one or methods consistent with embodiments of the present disclosure. In some embodiments, the Computer System 1101 may contain multiple Processors 1110 typical of a relatively large system. In other embodiments, however, the Computer System 1101 may be a single processor with a singular CPU 1112.

The Memory 1120 of the Computer System 1101 may include a Memory Controller 1122 and one or more memory modules for temporarily or permanently storing data (not depicted). In some embodiments, the Memory 1120 may include a random-access semiconductor memory, storage device, or storage medium (either volatile or non-volatile) for storing data and programs. The Memory Controller 1122 may communicate with the Processor 1110, facilitating storage and retrieval of information in the memory modules. The Memory Controller 1122 may communicate with the I/O Interface 1130, facilitating storage and retrieval of input or output in the memory modules. In some embodiments, the memory modules may be dual in-line memory modules.

The I/O Interface 1130 may include an I/O Bus 1150, a Terminal Interface 1152, a Storage Interface 1154, an I/O Device Interface 1156, and a Network Interface 1158. The I/O Interface 1130 may connect the Main Bus 1140 to the I/O Bus 1150. The I/O Interface 1130 may direct instructions and data from the Processor 1110 and Memory 1120 to the various interfaces of the I/O Bus 1150. The I/O Interface 1130 may also direct instructions and data from the various interfaces of the I/O Bus 1150 to the Processor 1110 and Memory 1120. The various interfaces may include the Terminal Interface 1152, the Storage Interface 1154, the I/O Device Interface 1156, and the Network Interface 1158. In some embodiments, the various interfaces may include a subset of the aforementioned interfaces (e.g., an embedded computer system in an industrial application may not include the Terminal Interface 1152 and the Storage Interface 1154).

Logic modules throughout the Computer System 1101—including but not limited to the Memory 1120, the Processor 1110, and the I/O Interface 1130—may communicate failures and changes to one or more components to a hypervisor or operating system (not depicted). The hypervisor or the operating system may allocate the various resources available in the Computer System 1101 and track the location of data in Memory 1120 and of processes assigned to various CPUs 1112. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining a first set of log files for a software system, wherein the first set of log files applies to a shortened window;
    detecting, a particular error-event surge in a detection period in the first set of log files that is abnormal as compared to the shortened window;
    determining that the particular error-event surge does not fit a periodic pattern of error-event surges in an extended window; and
    characterizing, based on the determining, the particular error-event surge as an anomaly.

2. The method of claim 1, wherein the characterizing comprises defining an anomaly window for the anomaly.

3. The method of claim 2, wherein defining the anomaly window comprises merging an activity period in which the particular error-event surge occurred with an adjacent period.

4. The method of claim 1, further comprising collecting event logs for the anomaly.

5. The method of claim 1, further comprising aggregating and normalizing the first set of log files.

6. A system comprising:
    a processor; and
    a memory in communication with the processor, the memory containing program instructions that, when executed by the processor, are configured to cause the processor to perform a method, the method comprising:
        obtaining a first set of log files for the software system, wherein the first set of log files applies to a shortened window;
        detecting a particular error-event surge in a detection period in the first set of log files that is abnormal as compared to the shortened window;
        determining that the particular error-event surge does not fit a periodic pattern of error-event surges in an extended window; and
        characterizing, based on the determining, the particular error-event surge as an anomaly.

7. The system of claim 6, wherein the characterizing comprises defining an anomaly window for the anomaly.

8. The system of claim 7, wherein defining the anomaly window comprises merging an activity period in which the particular error-event surge occurred with an adjacent period.

9. The system of claim 6, wherein the method performed by the system further comprises collecting event logs for the anomaly.

10. The system of claim 6, wherein the method performed by the system further comprises aggregating and normalizing the first set of log files.

11. A computer program product, the computer program product comprising a computer readable storage medium having program instructions embodied therewith, the program instructions executable by a computer to cause the computer to:
    obtain a first set of log files for a software system, wherein the first set of log files applies to a shortened window;
    detect a particular error-event surge in a detection period in the first set of log files that is abnormal as compared to the shortened window;
    determine that the particular error-event surge does not fit a periodic pattern of error-event surges in an extended window; and
    characterize, based on the determining, the particular error-event surge as an anomaly.

12. The computer program product of claim 11, wherein the characterizing comprises defining an anomaly window for the anomaly.

13. The computer program product of claim 11, wherein defining the anomaly window comprises merging an activity period in which the particular error-event surge occurred with an adjacent period.

14. The computer program product of claim 11, wherein the program instructions further cause the computer to aggregate and normalize the first set of log files.

15. The method of claim 1, further comprising:
    obtaining a second set of log files for a software system, wherein the second set of log files applies to the extended window; and
    identifying the periodic pattern in a set of error-event surges in the second set of log files.

16. The system of claim 6, wherein the method performed by the system further comprises:
    obtaining a second set of log files for a software system, wherein the second set of log files applies to the extended window; and
    identifying the periodic pattern in a set of error-event surges in the second set of log files.

17. The system of claim 11, wherein the program instructions further cause the computer to:

obtain a second set of log files for a software system, wherein the second set of log files applies to the extended window; and identify the periodic pattern in a set of error-event surges in the second set of log files.

18. The computer program product of claim 17, wherein the identifying comprises inserting the second set of log files into a sequence detection algorithm.

19. The method of claim 15, wherein the identifying comprises inserting the second set of log files into a sequence detection algorithm.

20. The system of claim 16, wherein the identifying comprises inserting the second set of log files into a sequence detection algorithm.

* * * * *